US012675784B2

(12) United States Patent (10) Patent No.: US 12,675,784 B2
Yamamoto et al. (45) Date of Patent: Jul. 7, 2026

(54) COMPUTER-READABLE RECORDING MEDIUM, INFORMATION PROCESSING METHOD, AND INFORMATION PROCESSING DEVICE

(71) Applicant: Fujitsu Limited, Kawasaki (JP)

(72) Inventors: Takuma Yamamoto, Yokohama (JP); Yuya Obinata, Kawasaki (JP); Daisuke Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 18/452,621

(22) Filed: Aug. 21, 2023

(65) Prior Publication Data

US 2024/0211917 A1 Jun. 27, 2024

(30) Foreign Application Priority Data

Dec. 23, 2022 (JP) ................................. 2022-207557

(51) Int. Cl.
　G06Q 20/20 (2012.01)
　G06Q 20/18 (2012.01)
　　　(Continued)

(52) U.S. Cl.
　CPC ........... G06Q 20/208 (2013.01); G06Q 20/18 (2013.01); G06V 10/98 (2022.01); G06V 20/52 (2022.01)

(58) Field of Classification Search
　CPC ...... G06Q 20/208; G06Q 20/18; G06V 20/52; G06V 10/98
　See application file for complete search history.

(56) References Cited

U.S. PATENT DOCUMENTS 7,334,729 B2 * 2/2008 Brewington ........... G06Q 30/06
　　　　　　　　　　　　　　235/383
7,909,248 B1 * 3/2011 Goncalves ........... G07G 1/0072
　　　　　　　　　　　　　　235/462.14

(Continued)

FOREIGN PATENT DOCUMENTS

AU　　2020289885　　10/2021
JP　　2019-029021　　2/2019
　　　　(Continued)

OTHER PUBLICATIONS

Rondán, Nicolás, et al. "Self-Checkout System Prototype for Point-of-Sale using Image Recognition with Deep Neural Networks." 2021 IEEE URUCON. IEEE, 2021. (Year: 2021).*

(Continued)

*Primary Examiner* — Nathan A Mitchell
(74) *Attorney, Agent, or Firm* — Fujitsu Intellectual Property Center

(57) ABSTRACT

A non-transitory computer-readable recording medium stores therein an information processing program that causes a computer to execute a process including, acquiring a video of a person who grasps an item to be registered in an accounting machine, by analyzing the acquired video, calculating a score indicating a level of reliability of the item that is contained in the video with respect to each of a plurality of possible items that are set previously, acquiring information on the item that is registered in the accounting machine by the person by operating the accounting machine, based on the calculated score, selecting a possible item from the possible items, and based on the selected possible item and the acquired information on the item, generating an alert indicating abnormality of the item that is registered in the accounting machine.

13 Claims, 18 Drawing Sheets

IMAGE RECOGNITION RESULT: watermelon

(51) Int. Cl.
   *G06V 10/98*       (2022.01)
   *G06V 20/52*       (2022.01)

(56) References Cited

U.S. PATENT DOCUMENTS

| | | | | |
|---|---|---|---|---|
| 8,196,822 | B2 * | 6/2012 | Goncalves | G07G 3/006 |
| | | | | 235/462.14 |
| 8,336,761 | B1 * | 12/2012 | McCloskey | G07G 1/0054 |
| | | | | 705/16 |
| 10,192,208 | B1 * | 1/2019 | Catoe | G07G 1/0054 |
| 10,650,265 | B1 * | 5/2020 | Price | G06V 20/20 |
| 10,664,722 | B1 | 5/2020 | Sharma et al. | |
| 11,727,229 | B1 * | 8/2023 | Lupo | G06K 7/1443 |
| | | | | 235/462.14 |
| 11,798,380 | B2 * | 10/2023 | Brakob | G06V 10/764 |
| 12,014,544 | B2 * | 6/2024 | Brakob | G06V 20/52 |
| 12,141,652 | B1 | 11/2024 | Kotlarsky | |
| 12,141,775 | B2 * | 11/2024 | Handshaw | G07G 1/0036 |
| 12,400,206 | B2 | 8/2025 | Brakob et al. | |
| 2007/0158417 | A1 * | 7/2007 | Brewington | G06Q 30/06 |
| | | | | 235/462.14 |
| 2010/0059589 | A1 | 3/2010 | Goncalves et al. | |
| 2012/0127314 | A1 | 5/2012 | Clements | |
| 2018/0096567 | A1 | 4/2018 | Farrow et al. | |
| 2019/0354770 | A1 | 11/2019 | Darvish | |
| 2020/0104565 | A1 * | 4/2020 | Zucker | G06Q 30/00 |
| 2020/0234056 | A1 * | 7/2020 | Pricochi | G06Q 30/0609 |
| 2020/0242392 | A1 | 7/2020 | Scott et al. | |
| 2020/0410825 | A1 * | 12/2020 | Birnie | H04N 23/45 |
| 2021/0117949 | A1 | 4/2021 | Guo et al. | |
| 2021/0374376 | A1 | 12/2021 | Swope et al. | |
| 2021/0397800 | A1 * | 12/2021 | Kim | A47F 9/048 |

| | | | | |
|---|---|---|---|---|
| 2022/0194454 | A1 | 6/2022 | Carter et al. | |
| 2022/0230514 | A1 | 7/2022 | Nakagawasai | |
| 2023/0037427 | A1 | 2/2023 | Brakob et al. | |
| 2023/0048635 | A1 | 2/2023 | Kravitz et al. | |
| 2023/0124756 | A1 | 4/2023 | Trim et al. | |
| 2023/0131444 | A1 | 4/2023 | Palande et al. | |
| 2023/0177391 | A1 * | 6/2023 | Packwood | G06V 20/52 |
| | | | | 706/12 |
| 2023/0245535 | A1 | 8/2023 | Xiao et al. | |
| 2024/0289604 | A1 | 8/2024 | Kotlarsky et al. | |

FOREIGN PATENT DOCUMENTS

| | | |
|---|---|---|
| KR | 10-2233126 B1 | 3/2021 |
| KR | 102419220 | 7/2022 |

OTHER PUBLICATIONS

EESR—Extended European Search Report mailed on Feb. 8, 2024 for corresponding European Patent Application No. 23194450.5 [7 pages].

KROA—Korean Office Action mailed on Mar. 12, 2025 for Korean Patent Application No. 10-2023-0121691, with English translation (10 pages). **US20100059589A1 cited in the KROA was previously submitted in the IDS filed on Feb. 21, 2024.

EESR—The Extended European Search Report mailed on Nov. 14, 2023 for European Patent Application No. 23196796.9 (9 pages).

KROA—Korean Office Action mailed on Mar. 12, 2025 for Korean Patent Application No. 10-2023-0127219, with English translation (12 pages).

USPTO—Non-Final Office Action mailed on Nov. 14, 2025 for U.S. Appl. No. 18/461,005 [pending].

\* cited by examiner

IMAGE RECOGNITION RESULT: wine
REGISTERED ITEM INFORMATION: confectionery

IMAGE RECOGNITION RESULT: watermelon

FIG.8

·SHINE MUSCAT
·HIGH-CLASS KYOHO
·REASONABLE GRAPES A
·REASONABLE GRAPES B
·IMPERFECT GRAPES A

IMAGE RECOGNITION RESULT: watermelon
REGISTERED ITEM INFORMATION: banana

COMPUTER-READABLE RECORDING MEDIUM, INFORMATION PROCESSING METHOD, AND INFORMATION PROCESSING DEVICE

CROSS-REFERENCE TO RELATED APPLICATION(S)

This application is based upon and claims the benefit of priority of the prior Japanese Patent Application No. 2022-207557, filed on Dec. 23, 2022, the entire contents of which are incorporated herein by reference.

FIELD

The embodiments discussed herein are related to a computer-readable recording medium, an information processing method, and an information processing device.

BACKGROUND

Stores that make merchandise sales, such as supermarkets, are increasingly introducing self-checkout terminal devices by which customers themselves register item information by scanning labels of items and check out the items for the purpose of reducing personnel costs by reducing checkout works and avoiding the checkout from having lone lines. In such a system in which customers themselves register items to be purchased, it is important that customers correctly register items to be purchased in self-checkout terminal devices.

For this reason, for example, a system that senses a fraudulent act of a customer using a monitoring camera video obtained by capturing images of the customer who uses a self-checkout terminal is under development. More specifically, the system senses a fraudulent act by specifying an item from a monitoring camera video using a machine learning model and comparing the item with item information that is registered in the self-checkout terminal device.
Patent Literature 1: Japanese Laid-open Patent Publication No. 2019-29021

SUMMARY

According to an aspect of an embodiment, a non-transitory computer-readable recording medium stores therein an information processing program that causes a computer to execute a process including, acquiring a video of a person who grasps an item to be registered in an accounting machine, by analyzing the acquired video, calculating a score indicating a level of reliability of the item that is contained in the video with respect to each of a plurality of possible items that are set previously, acquiring information on the item that is registered in the accounting machine by the person by operating the accounting machine, based on the calculated score, selecting a possible item from the possible items, and based on the selected possible item and the acquired information on the item, generating an alert indicating abnormality of the item that is registered in the accounting machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram for describing HOID;
FIG. 14 is a diagram illustrating an example of the hierarchic data.

DESCRIPTION OF EMBODIMENT(S)

When an item is specified from a monitoring camera video, for example, a machine learning model sometimes recognizes the item incorrectly because of a slight effect of imaging environments, such as the direction in which the item is imaged or lighting, and thus is not able to sense a fraudulent act of the customer correctly.

Accordingly, it is an object in one aspect of an embodiment of the present invention to sense a fraudulent act of a customer more accurately in a system by which a customer himself/herself registers items to be purchased.

Preferred embodiments of the present invention will be explained with reference to accompanying drawings. The examples do not limit the embodiment. The examples can be combined as appropriate as long as there is no inconsistency.

Figure 1:
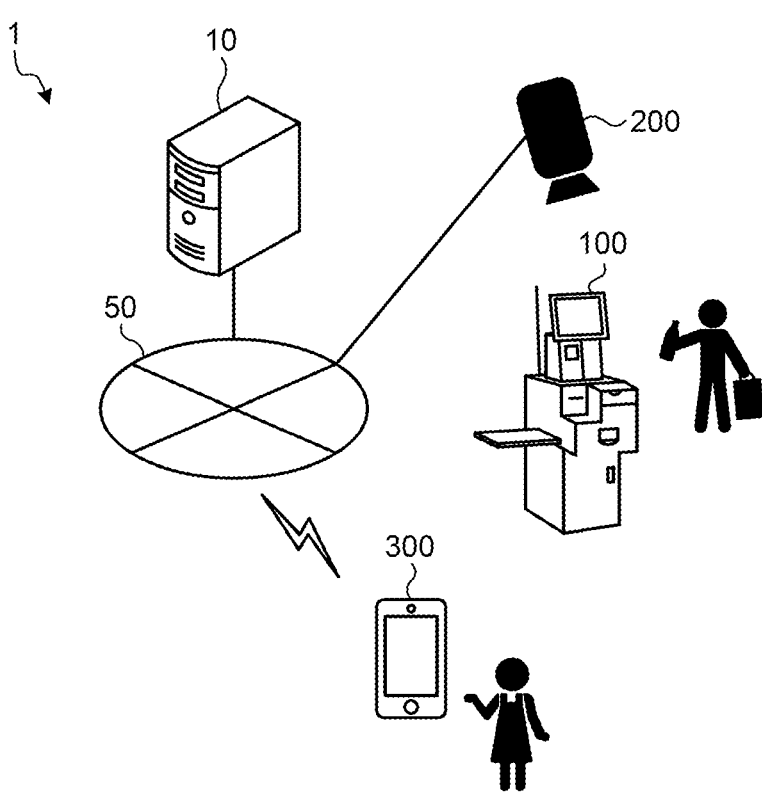
FIG. 1 is a diagram illustrating an example of a configuration of an information processing system according to an embodiment.

First of all, an information processing system for carrying out the embodiment will be described. FIG. 1 is a diagram illustrating an example of a configuration of an information processing system according to the embodiment. As illustrated in FIG. 1, an information processing system 1 is a system in which an information processing device 10 and a self-checkout terminal device 100 are connected via a network 50 such that the devices are able to communicate with each other. The information processing device 10 is also connected to a camera device 200 and a store-staff terminal device 300 via the network 50 such that the devices are able to communicate with each other.

Various types of communication networks, such as an intranet, can be employed as the network 50 regardless whether the network is wired or wireless. The network 50 is not necessarily a single network and, for example, an intranet and the Internet may be configured via a network device, such as a gateway, and another device (not illustrated in the drawing).

The self-checkout terminal device 100 is an information processing terminal device that is set, for example, in a checkout area in a store that makes merchandise sales, such as a supermarket, and that is for customers themselves to register items to be purchased and check out the items. The self-checkout terminal device 100 includes a code reader for scanning a label of an item and a touch-panel display unit on which a checkout screen, or the like, is displayed for making operations or is connected to an external code reader and an external display device such that they are able to communicate with each other. The self-checkout terminal device 100 is referred to as, for example, an accounting machine, a self checkout machine, a self checkout, an automated check-out, a self-checkout machine, and a self-check-out register.

Figure 2:
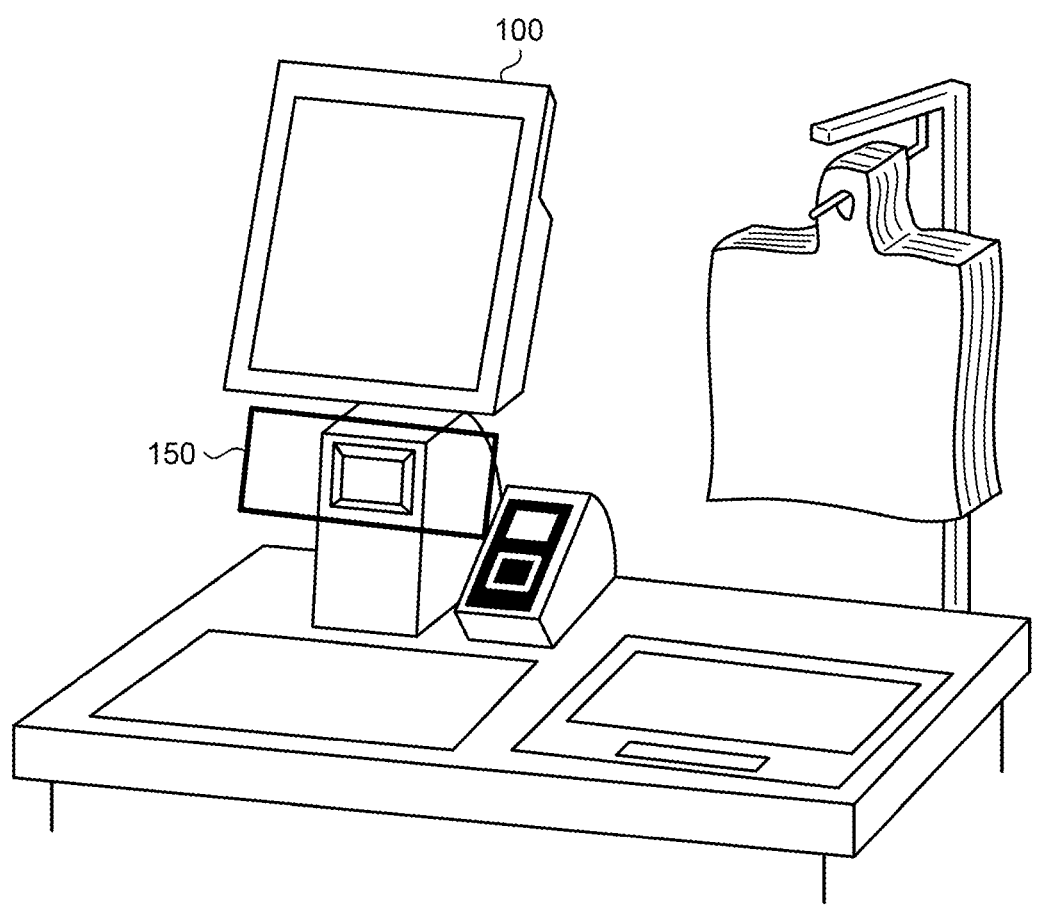
FIG. 2 is a diagram illustrating an example of a self-checkout terminal device 100 according to the embodiment.

FIG. 2 is a diagram illustrating an example of the self-checkout terminal device 100 according to the embodiment. To check out an item, for example, a customer scans a label of an item with a code reader 150 to register the item to be purchased in the self-checkout terminal device 100. The label of the item may contain, for example, a barcode. In the case of an item that is not labelled, such as a vegetable or a fruit, a customer, for example, selects the item to be purchased from an item list that is displayed on a display unit that the self-checkout terminal device 100 includes and registers the item to be purchased. The customer operates a checkout screen that is displayed on the display unit of the self-checkout terminal device 100 and checks out the item that is registered in the self-checkout terminal device 100 by cash, electronic money, a credit card, or the like.

Back to description of FIG. 1, the camera device 200 is a monitoring camera that is set above the self-checkout terminal device 100 and that captures images of a customer who check out with the self-checkout terminal device 100. There may be a plurality of the camera devices 200 for the respective self-checkout terminal devices 100. A video that is captured by the camera device 200 is transmitted to the information processing device 10.

The store-staff terminal device 300 may be a mobile terminal device, such as a smartphone or a tablet PC that a store staff in a supermarket, or the like, has, or an information processing device, such as a desktop PC or a laptop PC that is set in the checkout area in the store. When a fraudulent act of a customer is sensed by the information processing device 10, the store-staff terminal device 300 receives an alert from the information processing device 10. Note that there may be a plurality of the store-staff terminal devices 300 for the respective store staffs in the store and a terminal device of which the alert is notified may be limited to, for example, a terminal device that a specific store staff who is in charge of the checkout area has.

The information processing device 10 is, for example, an information processing device, such as a desktop personal computer (PC) or a laptop PC that is set in the store and that is used by a store staff or a manager or a server computer.

Note that FIG. 1 illustrates the information processing device 10 as a computer; however, the information processing device 10 may be a distributed computing system consisting of a plurality of computers. The information processing device 10 may be a cloud computer device that is managed by a service provider that provides cloud computing services.

The information processing device 10 receives a video obtained by the camera device 200 by capturing images of a customer (sometimes simply referred to as a "person") who checks out with the self-checkout terminal device 100 and an item from the camera device 200. The video includes a series of frames obtained by capturing images of the customer and the items, that is, a plurality of images and therefore video processing may include image processing.

For example, by inputting the video captured by the camera device 200 to a machine learning model, the information processing device 10 calculates a score indicating levels of reliability of the item contained in the video and, based on the score, selects a possible candidate from a plurality of possible items. The information processing device 10 then recognizes the selected possible item as an item to be purchased by the customer.

The information processing device 10 receives item information that is registered by the customer in the self-checkout terminal device 100 from the self-checkout terminal device 100. The information processing device 10, for example, compares an item corresponding to the registered item information with the item that is recognized as the item to be purchased from the video, when the items do not match, generates an alert indicating abnormality, and notifies the store-staff terminal device 300 of the alert. In this manner, the information processing device 10 senses a fraudulent act of the customer.

Figure 3:
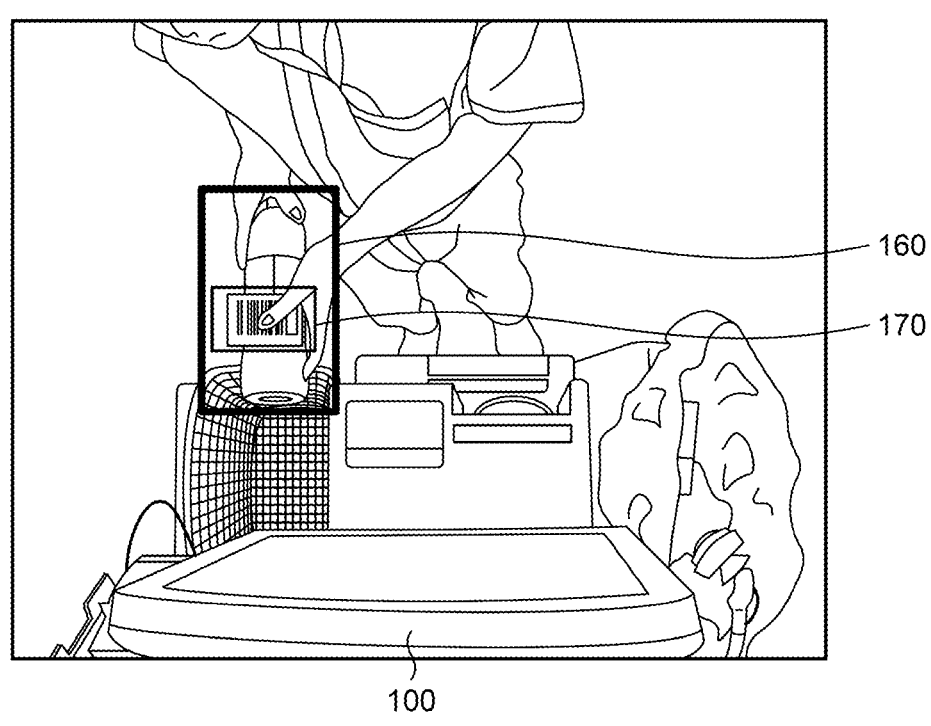
FIG. 3 is a diagram illustrating a label switch that is an example of a fraudulent act.

Fraudulent acts of customers in the system in which customers themselves register items to be purchased include, for example, acts referred to as a label switch and a banana trick. FIG. 3 is a diagram illustrating the label switch that is an example of the fraudulent act. FIG. 3 illustrates that a customer of which images are captured by the camera device 200, which is set above the self-checkout terminal device 100, commits a label switch. The label switch is an act of defrauding of an item as illustrated in FIG. 3 by overlapping an item 160 to be purchased with a label 170 of an item cheaper than the item 160 and scanning the label.

Figure 4:
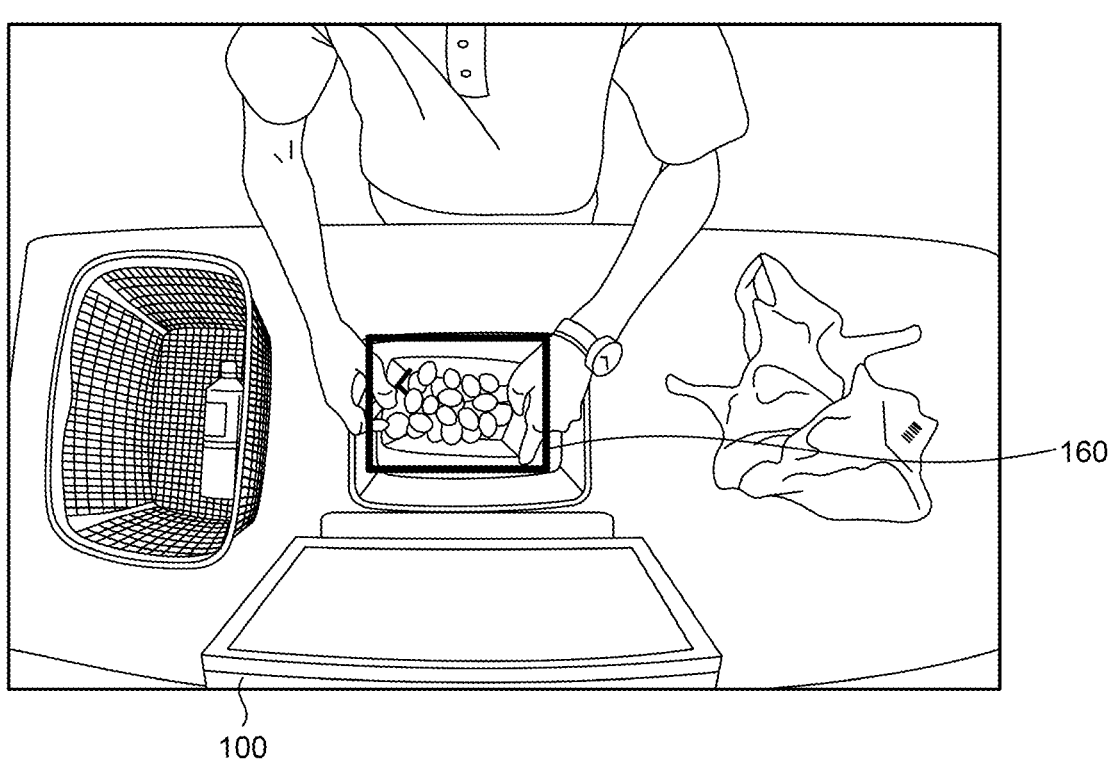
FIG. 4 is a diagram illustrating a banana trick that is another example of a fraudulent act.

FIG. 4 is a diagram illustrating the banana trick that is another example of the fraudulent act. The banana trick is, on the other hand, an act of defrauding of an item as illustrated in FIG. 4 by, when purchasing the item 160 that is not labelled, selecting an item cheaper than the item 160 from an item list displayed on the self-checkout terminal device 100 or inputting a smaller number.

In order to sense such a fraudulent act, the information processing device 10, for example, recognizes an item from a video using a machine learning model that is a contrastive language-image pre-training (CLIP) model to be described below from the video. The information processing device 10 may further use a machine learning model that is trained by machine learning using the video, which is captured by the camera device 200, as a feature value and using the object that is contained in the video, that is, the item as a ground-truth label.

Figure 5:
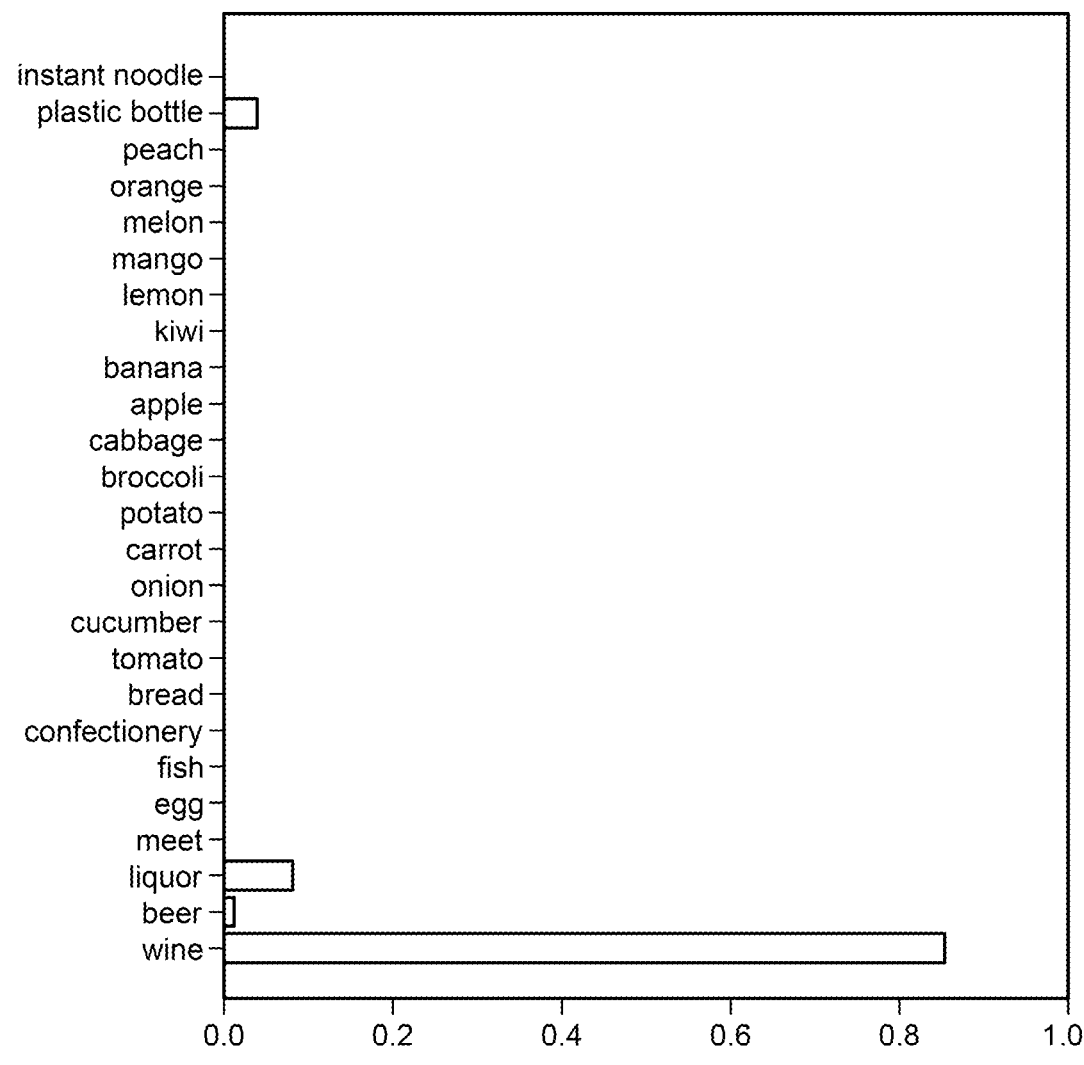
FIG. 5 is a diagram illustrating an example of an image recognition result obtained by a machine learning model.

FIG. 5 is a diagram illustrating an example of an image recognition result obtained by the machine learning model. FIG. 5 illustrates the example of the image recognition result obtained by inputting the video to the machine learning model that is trained in order to specify the item from the video as described above. The image recognition result in FIG. 5 is a graph in which the vertical axis represents class names uniquely indicating respective items and the horizontal axis represents scores indicating the levels of reliability presented by numerical values between 0.0 to 1.0. The respective items that are represented by the class names are, for example, possible items in a group of items that are dealt with in the store that makes merchandise sales, such as a supermarket, and that can be recognized from the video. The scores indicating the levels of reliability can be calculated by an existing AI technique and a higher score value indicates that the machine learning model more recognizes that the item contained in the video is an item corresponding to the score. In the example in FIG. 5, because a class "wine" presents the highest score value, the information processing device 10 specifies the item contained in the video as wine.

Figure 6:
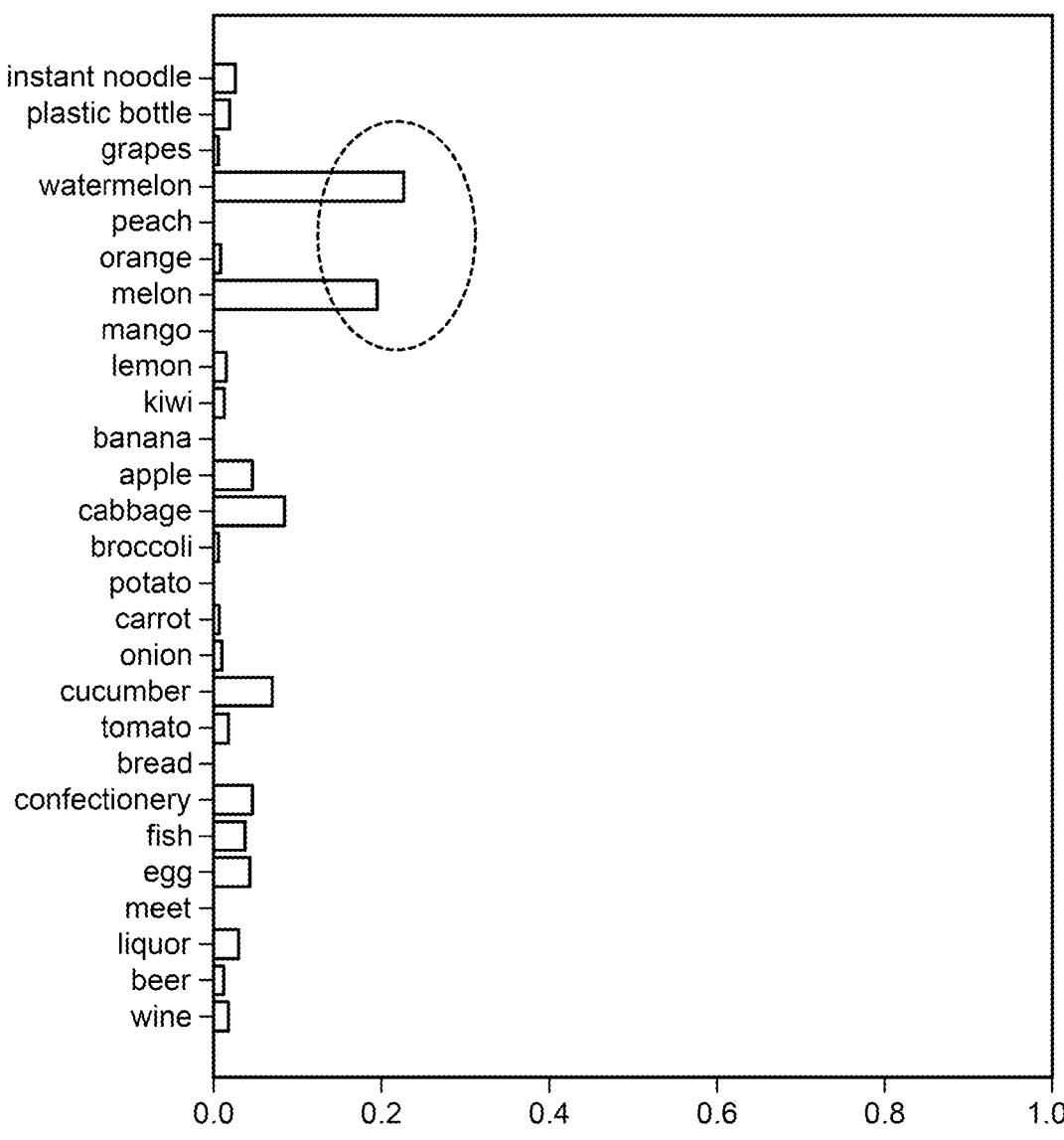
FIG. 6 is a diagram illustrating another example of the image recognition result obtained by the machine learning model.

The score values however sometimes compare to each other between similar items because of a slight effect of imaging environments, such as the direction in which the item is imaged and lighting. FIG. 6 is a diagram illustrating another example of the image recognition result obtained by the machine learning model. In the example in FIG. 6, the score values of a class "watermelon" and a class "melon" compare to each other and the class "watermelon" has the highest score value; however, the item contained in the video is in fact a melon and sometimes the item is recognized incorrectly. The machine learning model is artificial intelligence (AI) and therefore the score value of the incorrect class abnormally increases and thus the machine learning model possibly incorrectly recognizes the item contained in the video. Such incorrect recognition by the machine learning model leads to incapability of correctly sensing a fraudulent act of a customer.

An object of the embodiment is thus to, for example, sense a fraudulent act of a customer correctly even when score values in an image recognition result obtained by the machine learning model compare to each other or a score value of an incorrect class abnormally increases.

Functional Configuration of Information Processing Device 10

Figure 7:
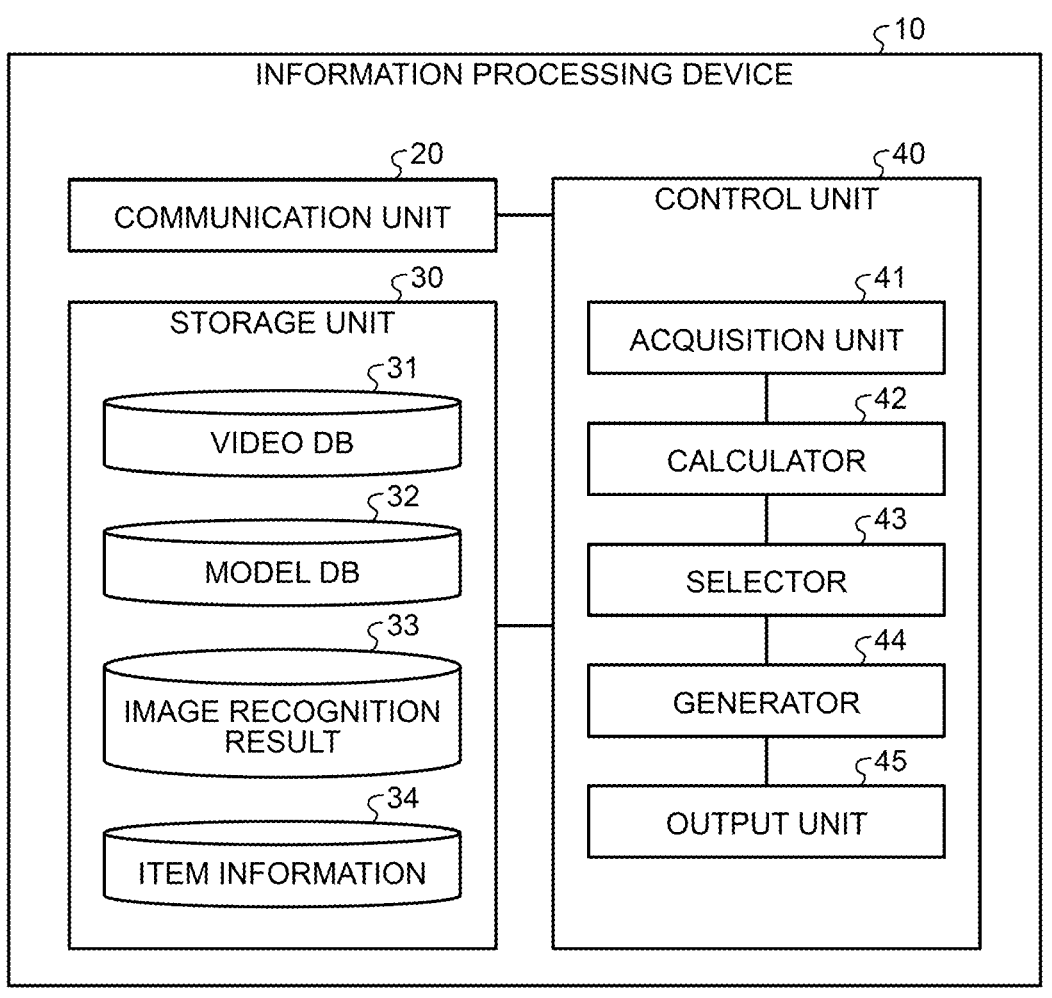
FIG. 7 is a diagram illustrating an example of a configuration of an information processing device 10 according to the embodiment.

A functional configuration of the information processing device 10 that mainly performs executions of the embodiment will be described next. FIG. 7 is a diagram illustrating the example of the configuration of the information processing device 10 according to the embodiment. As illustrated in FIG. 7, the information processing device 10 includes a communication unit 20, a storage unit 30, and a control unit 40.

The communication unit 20 is a processor that controls communications with other devices, such as the self-checkout terminal device 100 and the camera device 200, and is, for example, a communication interface, such as a network interface card.

The storage unit 30 has a function of storing various types of data and a program that the control unit 40 executes and, for example, is realized using a storage device, such as a memory or a hard disk. The storage unit 30 stores a video DB 31, a model DB 32, an image recognition result 33, item information 34, etc.

The video DB 31 stores, for example, a video that is captured by the camera device 200 and information on the video. Note that the video DB 31 may, for example, store information with respect to each of the self-checkout terminal device 100 and the camera device 200. The video that is captured by the camera device 200 is transmitted from the camera device 200 as needed and is stored in the video DB

31. The video DB 31 may, for example, store image data that is a resultant video obtained by performing image processing on a video in the embodiment.

The model DB 32 stores, for example, information on the machine learning model for specifying an item contained in a video captured by the camera device 200 from the video, model parameters for configuring the machine learning model, and training data.

The image recognition result 33, for example, stores information on an image recognition result obtained by the machine learning model for specifying an item contained in a video that is captured by the camera device 200 from the video. The image recognition result may be score values of respective items like those presented in FIG. 5 or FIG. 6.

The item information 34 stores, for example, information on the item that is registered by the customer in the self-checkout terminal device 100. Note that the item information 34 may store information, such as the identifier and the name of an item that is registered as an item to be purchased, the number of items to be purchased and the price, with respect to each self-checkout terminal device 100 and each customer. The information on the item that is registered by the self-checkout terminal device 100 is transmitted from the self-checkout terminal device 100 as needed and is stored in the item information 34.

The above-described information that is stored in the storage unit 30 is an example only and the storage unit 30 is able to store various sets of information other than the above-described information.

The control unit 40 is a processor in charge of the whole information processing device 10 and is, for example, a processor. The control unit 40 includes an acquisition unit 41, a calculator 42, a selector 43, a generator 44, and an output unit 45. Each of the processors is an example of an electronic circuit that the processor includes or an example of the process that the processor executes.

The acquisition unit 41, for example, acquires a video of a person who grasps an item to be registered in the accounting machine that is the self-checkout terminal device 100 from the video DB 31. The acquisition unit 41, for example, acquires information on the item that is registered in the accounting machine by the person by operating the accounting machine that is the self-checkout terminal device 100 from the item information 34.

For example, by inputting the video that is acquired by the acquisition unit 41 to the machine learning model, the calculator 42 calculates a score indicating a level of reliability of the item contained in the video with respect to each of a plurality of sets of possible items that are set previously. More specifically, as described using FIG. 5 and FIG. 6, the calculator 42 calculates a score of each of the items using the machine learning model that is trained by machine learning using the video that is captured by the camera device 200 as a feature value and using the item contained in the video as the ground-truth label. The possible items that are set previously may be, for example, the group of items that are dealt with in a store that makes merchandise sales, such as a supermarket, and may be stored in the storage unit 30 previously.

As for objects that are contained in the video, there can be various objects, such as a shopping basket and a plastic bag and the self-checkout terminal device 100, other than the item. Thus, for example, using HOID (Human Object Interaction Detection) that is an existing technique, the object that the person grasps may be detected as an item.

Figure 8:
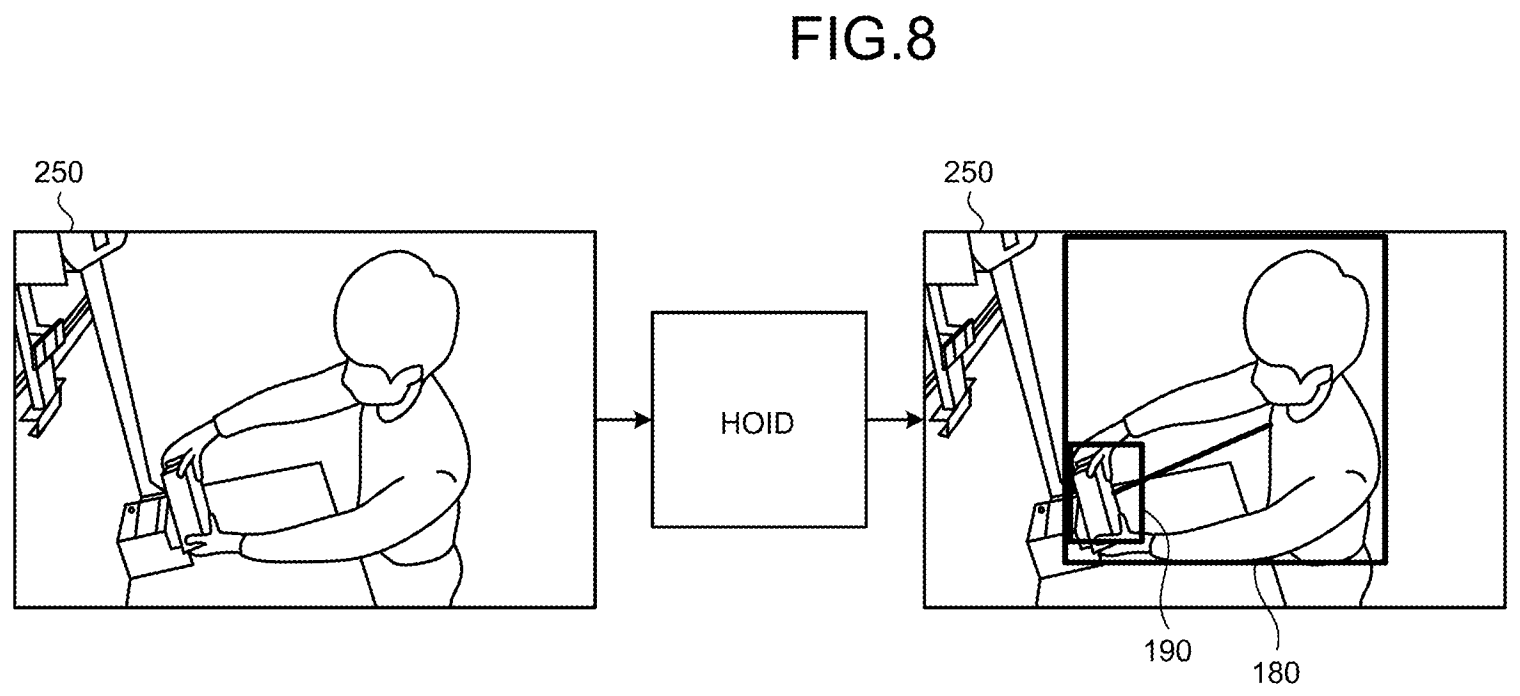

FIG. 8 is a diagram for describing HOID. HOID detects interaction between a human and an object and, for example, as illustrated in FIG. 8, is a technique of, using image data 250 as input data, detecting a person and an object that are determined as having an interaction relationship that, for example, the person holds the object in his/her hand. Detection of the person and the object, for example, as illustrated in FIG. 8, is presented as bounding boxes (BB) that are rectangular areas surrounding the person and the object that are detected. In the case in FIG. 8, the BBs of the person and the object are a person BB 180 and an object BB 190, respectively. In HOID, a probability value of interaction between the person and the object and a class name (for example, "hold") are also output. In the embodiment, using HOID, the object that the person grasps is detected as an item.

Based on the scores that indicate the levels of reliability and that are calculated by the calculator 42, the selector 43 selects a possible item from the possible items. More specifically, the selector 43, for example, selects the item with the highest score indicating the level of reliability as the possible item.

For example, as described below, the selector 43 may select a possible item using a machine learning model that refers to reference source data in which item attributes are associated with each of a plurality of layers. (1) First of all, by inputting an acquired video to the machine learning model that refers to the reference original data in which item attributes are associated with each of the layers, the calculator 42 specifies a first item attribute that is contained in the video from the item attributes of a first layer. (2) For example, based on the specified first item attribute, the calculator 42 then specifies second item attributes from the item attributes of a second layer under the first layer. (3) For example, by inputting the acquired video to the machine learning model, the calculator 42 selects an item attribute contained in the video as a possible item from the second item attributes.

The item attributes of the first layer may be, for example, types of items, such as "fruit", "fish" and "meat". The item attributes of the second layer may be, for example, "expensive grapes", "inexpensive grapes", etc., under the item attribute "fruit" of the first layer. The depth of the layer is not limited to that to the second layer and a third layer and layers following the third layer may succeed. Item attributes of the third layer may be, for example, "shine muscat (4500 yen)", "high-class grapes (3900 yen)", etc., under the item attribute "expensive grapes" of the second layer. As described above, by segmenting the item attributes as the layer deepens and the item attributes are narrowed down in each layer to make an estimation using the machine learning model, the selector 43 is able to select the item attribute contained in the video as a possible item more accurately and in detail.

Selection of a possible item using a CLIP model 60 that is the machine learning model that refers to the reference source data in which item attributes are associated with each of the layers will be described more in detail.

Figures 9, 10:
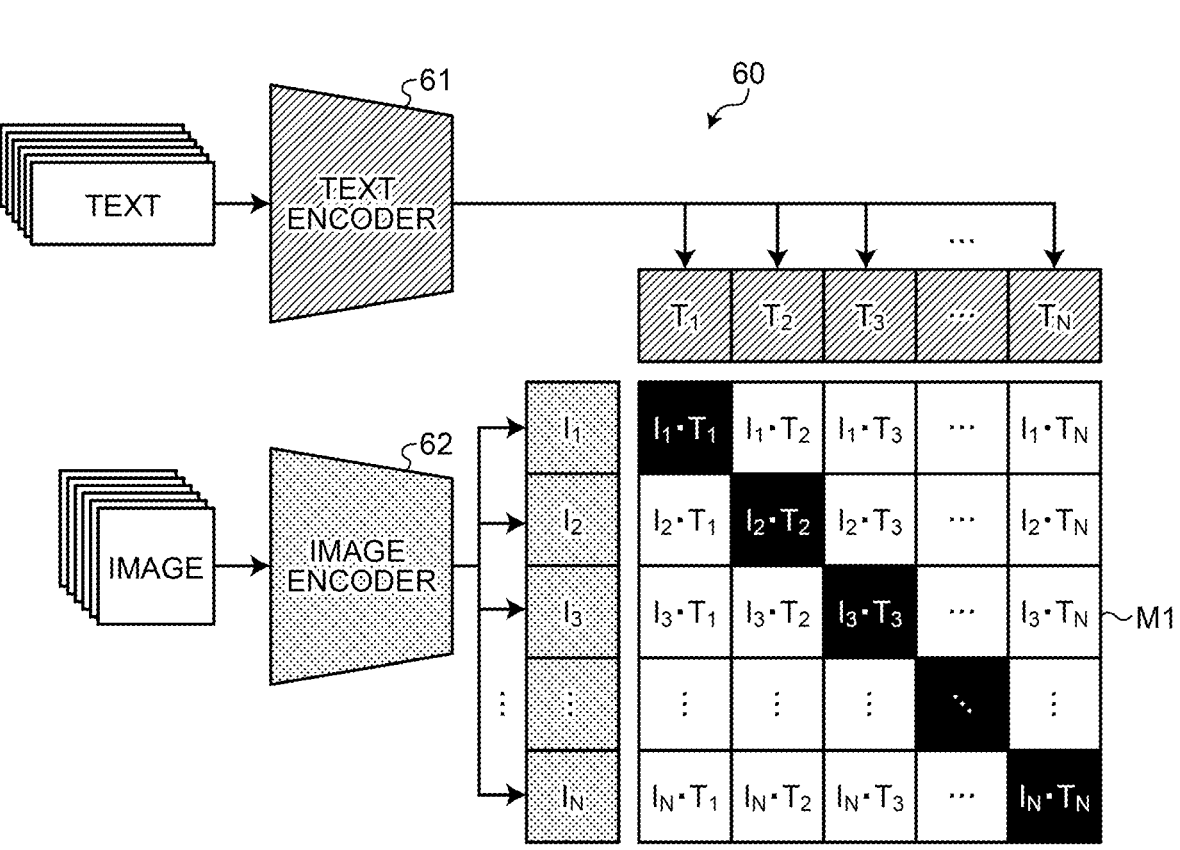
FIG. 9 is a diagram illustrating machine learning of a CLIP model 60.
FIG. 10 is a diagram illustrating an example of an item list.

FIG. 9 is a diagram illustrating machine learning of the CLIP model 60. FIG. 9 illustrates the CLIP model 60 that is an example of a zero-shot image classifier as an example of the CLIP model 60. CLIP is a technique that realizes embedding of multiple types of images and texts, that is, multimodal embedding in a feature value space. In other words, in CLIP, training an image encoder and a text encoder realizes embedding by which an image and a text in a pair whose meanings are close to each other get close to each other in vector distance. For example, the image encoder may be realized by ViT (Vision Transformer) or may be realized by a convolutional-type neural network, for example, ResNet, or the like. The text encoder may be realized by Transformer based on GPT (Generative Pretrained Transformer) or may be realized by a regression-type neural network, for example, LSTM (Long Short-Term Memory).

As illustrated in FIG. 9, a pair of an image and a text in a pair are used as training data to train the CLIP model 60. A dataset obtained by extracting an image and a text that is described as a caption of the image in a pair from a web page on the Internet, that is, WIT (WebImage Text) is usable as such training data. For example, a photograph of an apple or an image, such as a drawing of an illustration of an apple and a text "a photograph of an apple" described as a caption of the image in a pair serve as training data. Using WIT as training data as described above makes it possible do not need labelling and to acquire a large amount of training data.

From the image and the text in a pair, the image is input to an image encoder 62 and the text is input to a text encoder 61. The image encoder 62 to which the image is input as described above outputs a vector in which the image is embedded in the feature value space. On the other hand, the text encoder 61 to which the text is input outputs a vector in which the text is embedded in the feature value space.

For example, FIG. 9 exemplifies a mini-batch of a batch size N containing training data of N pairs of a pair of an image 1 and a text 1, a pair of an image 2 and a text 2, . . . and an image N and a text N. In this case, by inputting each of the images and the texts in N pairs to the image encoder 62 and the text encoder 61, it is possible to obtain a similarity matrix M1 of N×N embedding vectors. "Similarity" herein may be an inner product of embedding vectors or cosine similarity as an example only.

To train the CLIP model 60, because there are various types of forms of web text captions and thus labels are indefinite, an objective function that is referred to as a contrastive objective is used.

As for the contrastive objective, in the case of an i-th image of the mini-batch, an i-th text corresponds to a correct pair and therefore, while the i-th text serves as a positive example, all other texts serve as negative examples. In other words, because a single positive example and n−1 negative examples are set in each set of training data, N positive examples and $N^2$−N negative examples are generated over the mini-batch. For example, in the example of the similarity matrix M1, elements of N diagonal components in which a black-white inverse display is made are positive examples and $N^2$−N elements on which a white display is made are negative examples.

Under the similarity matrix M1, the parameters of the image encoder 62 and the text encoder 61 that maximize the similarity of the N pairs corresponding to the positive examples and that minimize the similarity of the $N^2$−N pairs corresponding to the negative examples are trained.

For example, in the example of the first image 1, the first text serves as a positive example, the second and following texts serve as negative examples, and a loss, for example, a cross entropy error is calculated in the row direction of the similarity matrix M. By executing such calculation of a loss in each of the N images, losses on the images are calculated. On the other hand, in the example of the second text 2, the second image serves as a positive example, all the images other than the second image serve as negative examples, and a loss is calculated in the column direction of the similarity matrix M. By executing such calculation of a loss in each of the N texts, losses on the texts are calculated. An update on the parameters that minimize a statistical value of the losses of the images and the losses on the texts, for example, an average is executed on the image encoder 62 and the text encoder 61.

Because of such training of the image encoder 62 and the text encoder 61 that minimizes the contrastive objective, the trained CLIP model 60 is generated.

A list of texts that are what is referred to as class captions is generated as the reference source data that the CLIP model 60 refers to and the list is input to the CLIP model 60. The reference source data is, for example, data obtained by listing texts in which item attributes are associated with each of a plurality of layers based on a relationship of distribution of the item attributes contained in item data.

Generation of the reference source data that the CLIP model 60 refers to will be described more specifically. The reference source data, for example, is generated by the generator 44. First of all, the generator 44 acquires an item list of a store, such as a supermarket. Acquisition of an item list is realized, as an example only, by acquiring a list of items that are registered in an item master obtained by compiling items of the store into a database.

FIG. 10 is a diagram illustrating an example of the item list. FIG. 10 selectively presents "Shine muscat", "high-class Kyoho", "reasonable grapes A", "reasonable grapes B" and "imperfect grapes A" as an example of the items of the fruit "grapes" from among all the items that are sold in the store.

Figure 11:
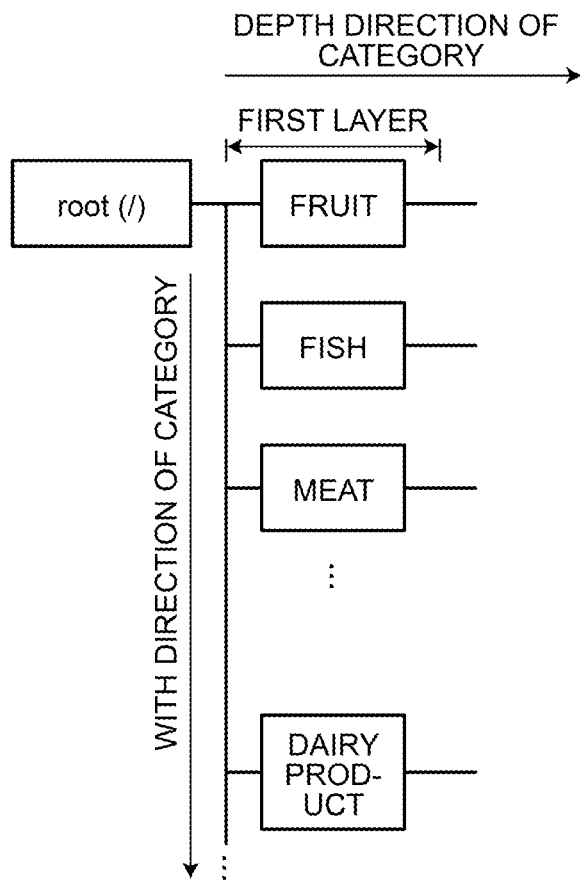
FIG. 11 is a diagram illustrating an example of a template.

Furthermore, the generator 44 acquires a hierarchic template as an example only. It is possible to acquire the hierarchic template, for example, by generating a hierarchic template by setting categories of items that are sold in the store, for example, "fruit", "fish", "meat", etc., as elements of a first layer. FIG. 11 is a diagram illustrating an example of the template. As illustrated in FIG. 11, the template has a hierarchic structure with root at the top. Furthermore, categories, such as "fruit", "fish", "meat", . . . , "dairy product" are contained as elements (nodes) in the first layer at a depth "1" from the root. Note that, FIG. 11 exemplifies the template in which the categories of items serve as the first layer to simplify the description; however, broad categories of items, for example, categories like fruit and fish, may serve as the first layer and narrow categories of items, for example, categories like grapes and apple may serve as the second layer.

The generator 44 then adds attributes that are specified by system definition or user definition with respect to each of the elements of the first layer, for example, attributes of the "price" of the items to the bottom layer of the hierarchic template, that is, under the first layer in the example in FIG. 11. Attributes of the "price" are sometimes referred to as "price attributes" below. The price attributes are taken as an example of the attributes that are added; however, other attributes, for example, the color, the shape and the number of items in stock may be added.

Figure 12:
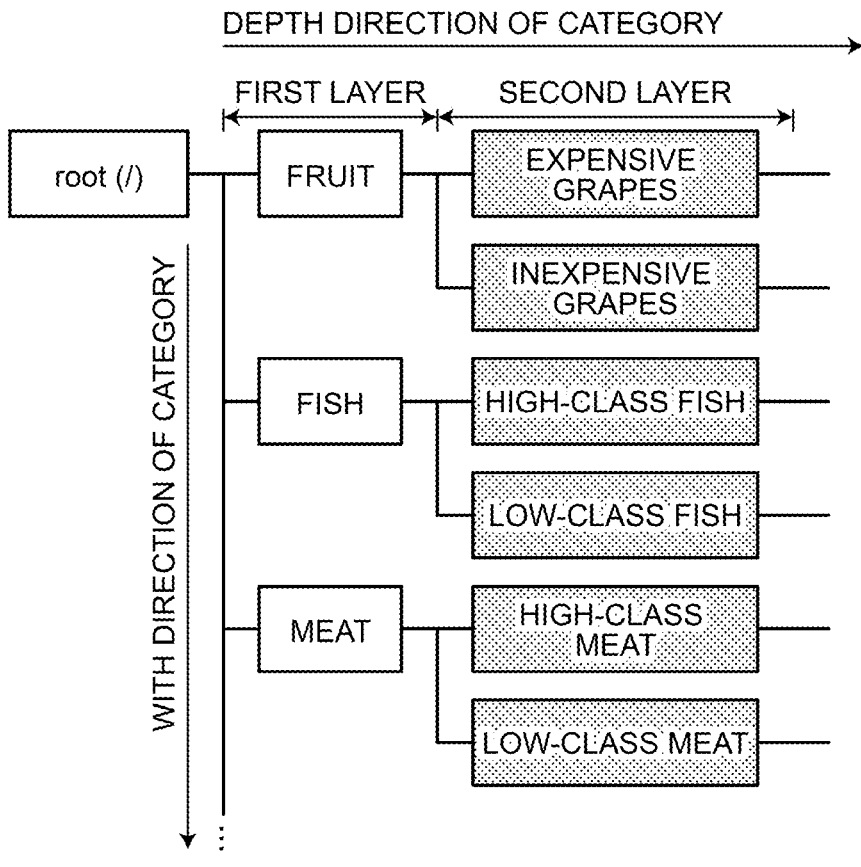
FIG. 12 is Diagram (1) illustrating generation of hierarchic data.

FIG. 12 is Diagram (1) illustrating generation of the hierarchic data. FIG. 12 illustrates the elements corresponding to the template illustrated in FIG. 11 in white and illustrates the attributes that are added to each of the elements in a hatched manner. In the example in FIG. 12, an attribute of the "price" of the item is added as each element of the second layer. For example, "expensive grapes" and "inexpensive grapes" are added to the element "fruit" of the first layer as the elements of the second layer. Note that, two price attributes are added per element; however, the number of elements of attributes that are added is not limited to two and one or three or more elements may be added. For example, three price attributes that are elements "expensive grapes", "mid-priced grapes" and "inexpensive grapes" of the second layer may be added to the element "fruit" of the first layer. The number of attributes that are added to each element of the first layer may be changed. In this case, for example, it is possible to increase the number of attributes as the types and the number of items that belong to the elements of the first layer or price distribution increase.

The generator 44, for example, extracts an item whose similarity to each element of the bottom layer of the hierarchic structure under generation, that is, each element k of a price attribute belonging to the second layer in the example in FIG. 12 is at or above a threshold th1.

Figure 13:
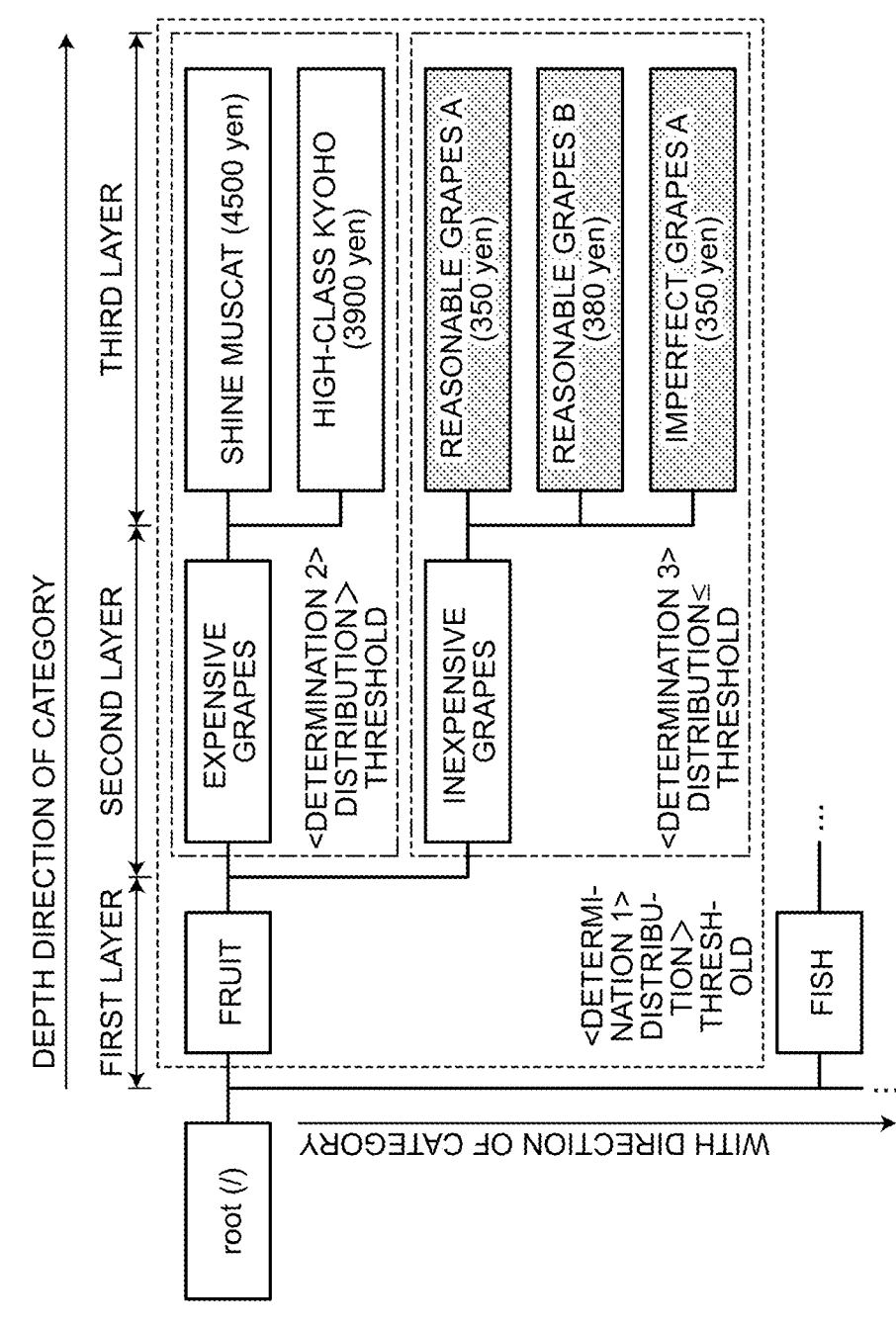
FIG. 13 is Diagram (2) illustrating generation of the hierarchic data.

FIG. 13 is Diagram (2) illustrating generation of the hierarchic data. FIG. 13 selectively presents an example of the item category "fruit". For example, in the case of the element "expensive grapes" of the second layer illustrated in FIG. 13, by inputting the corresponding text "expensive grapes" to the text encoder 61 of the CLIP model 60, embedding vectors of the element "expensive grapes" of the second layer is obtained. On the other hand, by inputting the text corresponding to each item contained in the item list illustrated in FIG. 10 to the text encoder 61 of the CLIP model 60, an embedding vector of each item is obtained. Similarity between the embedding vector of the element "expensive grapes" of the second layer and the embedding vector of each item is calculated. As a result, the items "Shine muscat" and "high-class Kyoho" with similarity to the embedding vector of the element "expensive grapes" of the second layer that is at or above the threshold th1 are extracted for the element "expensive grapes" of the second layer. Similarly, the items "reasonable grapes A", "reasonable grapes B" and "imperfect grapes A" with similarity to the embedding vector of the element "inexpensive grapes" of the second layer that is at or above the threshold th1 are extracted for the element "inexpensive grapes" of the second layer. Note that extraction of items by matching of embedding vectors between texts is exemplified herein; however, one or both of the vectors may be embedding vectors of images.

The generator 44, for example, calculates a price distribution V of an item belonging to each element n of each of layers from the first layer to the M−1-th layer excluding the M-th layer that is the bottom layer among all M layers of the hierarchic structure under generation. The generator 44, for example, determines whether the price distribution V is at or under a given threshold th2. When the price distribution V is at or under the given threshold th2, the generator 44 determines to terminate searching layers subordinate to the element n. On the other hand, when the price distribution V is above the threshold th2, the generator 44 increments a layer loop counter by one and repeats calculation of price distribution and determination on the threshold of distribution with respect to each element of the layer a layer lower.

The case where the first layer illustrated in FIG. 13 is a m-th layer and the element "fruit" of the first layer is an element n is taken as an example only. In this case, as presented by the frame in a dashed line in FIG. 13, the element "fruit" of the first layer contains five items of "Shine muscat (4500 yen)", "high-class Kyoho (3900 yen)", "reasonable grapes A (350 yen)", "reasonable grapes B (380 yen)", and "imperfect grapes A (350 yen)". A price distribution $V_{11}$ is not at or under the threshold th2 (Determination 1 in the drawing), searching a subordinate layer is continued. In other words, the layer loop counter m is incremented by one and the second layer serves as a m-th layer.

The case where the second layer illustrated in FIG. 13 is a m-th layer and the element "expensive grapes" of the second layer is an element n is taken as an example next. In this case, as presented by the frame in an alternate long and short dash line in FIG. 13, the element "expensive grapes" of the second layer contains two items of "Shine muscat (4500 yen)", and "high-class Kyoho (3900 yen)". A price distribution $V_{21}$ is not at or under the threshold th2 (Determination 2 in the drawing), the element "expensive grapes" of the second layer is an element of the layer a layer higher than the third layer that is the bottom layer, that is, a M−1-th layer of all the M layers, and searching thus ends.

Furthermore, the case where the second layer illustrated in FIG. 13 is a m-th layer and the element "inexpensive grapes" of the second layer is an element n is taken as an example. In this case, as presented by the frame in an alternate long and two short dashes line in FIG. 13, the element "inexpensive grapes" of the second layer contains three items of "inexpensive grapes A (350 yen)", "inexpensive grapes B (380 yen)", and "imperfect grapes (350 yen)". A price distribution $V_{22}$ is at or under the threshold th2 (Determination 3 in the drawing), it is determined to terminate searching a subordinate layer.

The generator 44 determines to terminate searching that is started with respect to each element of the first layer or repeats searching until all the elements of the M−1-th layer are searched. The generator 44 then determines a depth or each route of the hierarchic structure based on the result of determination on price distribution that is obtained at the searching described above.

In the example in FIG. 13, when there is an element with a price distribution of an item at or under the threshold th2 in a route from the top element to the element of the bottom layer in the hierarchic structure having M layers in total, the generator 44 sets the element as a terminal node as an example only. On the other hand, in the example in FIG. 13, when there is no element with a price distribution of an item at or under the threshold th2 in the route from the top element to the element of the bottom layer, the generator 44 sets the element corresponding to the item as a terminal node.

For example, in the example illustrated in FIG. 13, the route connecting the element "fruit" of the first layer, the element "expensive grapes" of the second layer, and the element "Shine muscut" or "expensive Kyoho" of the third layer is taken as an example. In the route, any of the price distribution $V_{11}$ in the element "fruit" of the first layer and the price distribution $V_{21}$ in the element "expensive grapes" of the second layer is not determined to be at or under the threshold th2. For this reason, in the route, the elements "Shine muscut" and "expensive Kyoho" of the third layer are set as terminal nodes.

On the other hand, in the example illustrated in FIG. 13, the route connecting the element "fruit" of the first layer, the element "inexpensive grapes" of the second layer, and the element "reasonable grapes A", "reasonable grapes B" or "imperfect grapes A" of the third layer is taken as an example. In the route, while the price distribution $V_{11}$ in the element "fruit" of the first layer is not determined to be at or under the threshold th2, the price distribution $V_{22}$ in the element "reasonable grapes" of the second layer is determined to be at or under the threshold th2. For this reason, in the route, the element "reasonable grapes" of the second layer is set as the terminal node.

As described above, a depth of each route of the hierarchic structure having M layers is determined and accordingly a hierarchic structure is fixed, and hierarchic data is generated. Based on the generated hierarchic data, a list of texts that are what is referred to as class captions is generated as the reference source data that the CLIP model 60 refers to. The hierarchic data and the reference source data that are generated, for example, may be stored in the model DB 32, or the like.

Figure 14:
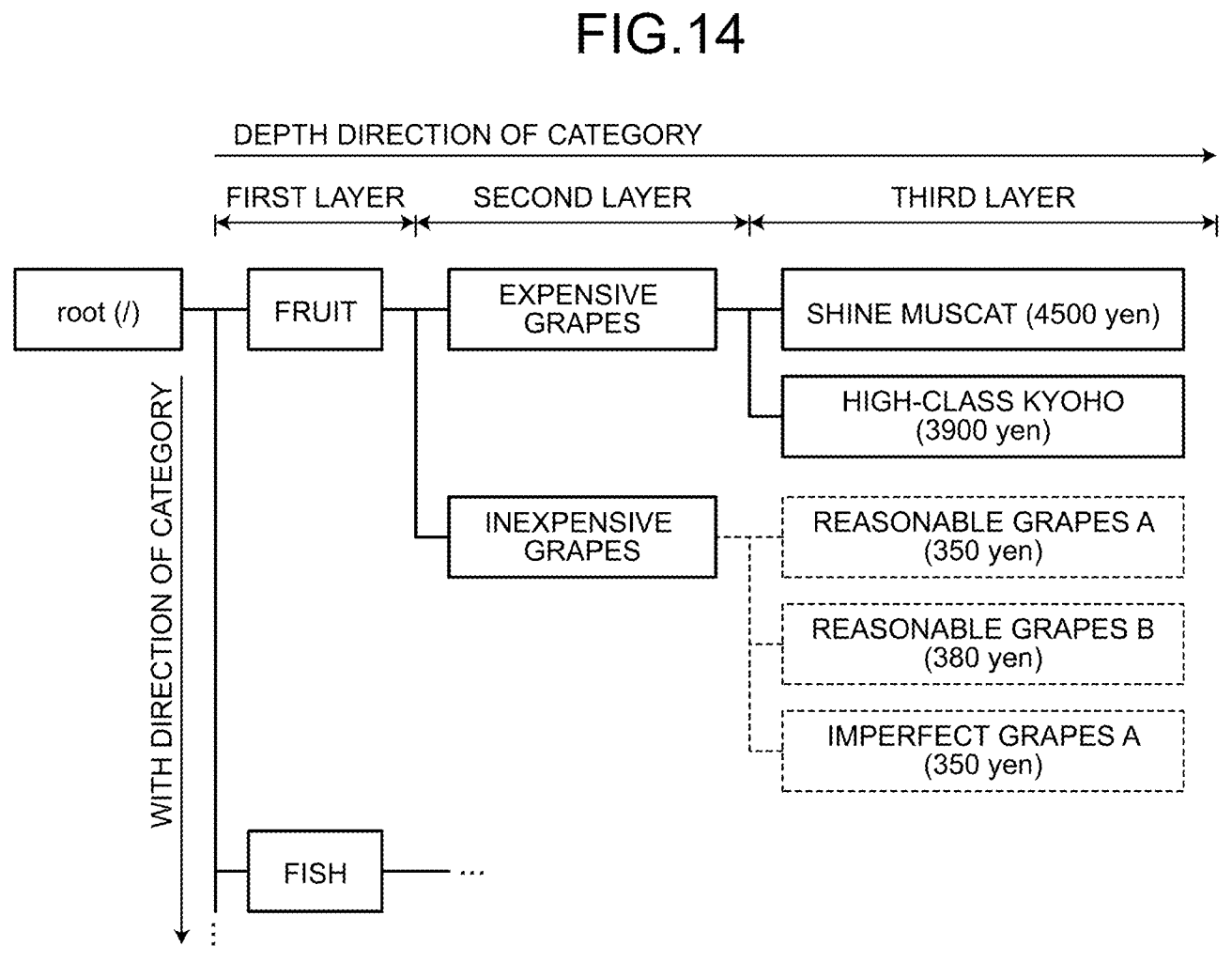

FIG. 14 is a diagram illustrating an example of the hierarchic data. In the example in FIG. 14, the elements of the layer subordinate to the terminal node with the price distribution of the item at or under the threshold th2 are not contained in the hierarchic data and thus are presented by dashed lines. In other words, taking the route containing the element "fruit" of the first layer in FIG. 14 as an example, the hierarchic data contains a route connecting the element "fruit" of the first layer, the element "expensive grapes" of the second layer, and the elements "Shine muscat" or "high-class Kyoho" of the third layer. Furthermore, as illustrated in FIG. 14, the hierarchic data contains a route connecting the element "fruit" of the first layer and the element "inexpensive grapes" of the third layer are connected.

A list of class captions based on such hierarchic data is input to a zero shot image classifier that is an example of the CLIP model 60. For example, a list of a text "fruit" and a text "fish" is input as a list of class captions of the first layer to the text encoder 61 of the CLIP model 60. Assume that "fruit" is output from the CLIP model as a label of the class corresponding to the input image to the image encoder 62. In this case, a list of texts "expensive grapes" and "inexpensive grapes" is input as a list of class captions of the second layer to the text encoder 61 of the CLIP model 60.

As described above, a list obtained by listing texts corresponding to the item attributes belonging to the same layer in order from the top layer of the hierarchic structure is input as class captions of the CLIP model 60. Accordingly, it is possible to cause the CLIP model 60 to execute narrowing possible items with respect to each layer. For this reason, it is possible to reduce the process cost of task realization compared to the case where a text list corresponding to all the items in the store as class captions of the CLIP model 60.

Furthermore, in the hierarchic structure that the CLIP model 60 refers to, because elements subordinating to the element with a price distribution of an item at or under the threshold th2 are omitted, it is possible to cluster items with a small difference between damages caused when a fraudulent act occurs. This makes it possible to realize further reduction of the cost of a process of realizing a task.

Back to description of FIG. 7, for example, based on the possible item that is selected by the selector 43 and information on the item that is registered in the accounting machine, which is the self-checkout terminal device 100, and that is acquired by the acquisition unit 41, the generator 44 generates an alert indicating abnormality of an item that is registered in the accounting machine.

As described using FIG. 6, when score values compare to each other between similar items, the possible item that is selected by the selector 43 may be recognized incorrectly. For this reason, for example, as described below, the generator 44 determines whether to generate the alert and then generates an alert when generation of the alert is needed.

Figure 15:
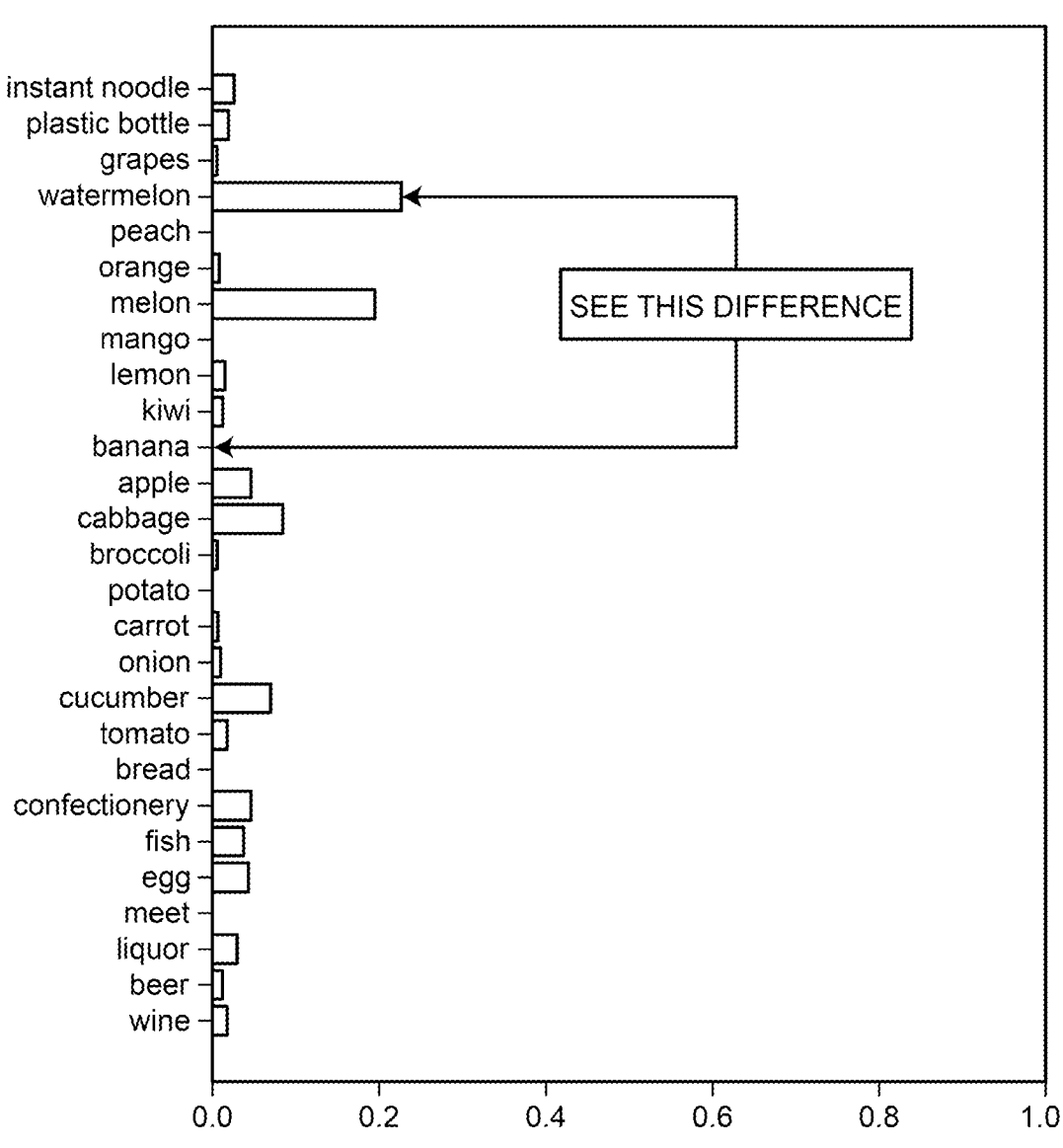
FIG. 15 is a diagram illustrating an example of fraudulence sensing according to the embodiment.

FIG. 15 is a diagram illustrating an example of fraudulence sensing according to the embodiment. The scores of the respective items illustrated in FIG. 15 are the same as those illustrated in FIG. 6. In this case, "watermelon" indicating the highest score value is output as an image recognition result and is selected as a possible item. The score values however compare to each other between the class "watermelon" and the class "melon" and thus there is a possibility that the possible item is recognized incorrectly.

In the embodiment, as illustrated in FIG. 15, a fraudulent act of a customer is sensed by comparing score values of an item indicating the highest score value, that is, a possible item and an item based on information on an item that is registered in the self-checkout terminal device 100. This is based on an idea that, even if there is a possibility that the item recognized from the video is incorrect, a fraudulent act is highly likely to be committed when it is only known that the item in the video and the item registered in the self-checkout terminal device 100 are different.

In the example in FIG. 15, because the item that is registered in the self-checkout terminal device 100 is banana, the item that is recognized from the video is watermelon, and the score values of the items have a difference at or above a given threshold, such as 0.2, the items are different from each other obviously. In such a case, the generator 44 senses a fraudulent act of a customer and determines to generate an alert indicating abnormality of the item that is registered in the self-checkout terminal device 100.

Determination on whether to generate an alert will be described more specifically. (1) First of all, the generator 44 specifies a possible item with a first score that is the largest from the scores corresponding to a plurality of possible items, respectively. (2) The generator 44 then specifies a second score corresponding to the item that is registered in the accounting machine that is the self-checkout terminal device 100 from the scores corresponding to the possible items, respectively. (3) When the possible item with the first score and the item that is registered in the accounting machine do not match, the generator 44 determines whether to generate the alert based on the difference between the first score and the second score. As for the determination in (3), for example, as described above, when the difference between the first score and the second score is at or above the given threshold, the items corresponding to the scores, respectively, are recognized as being different from each other and it is determined to generate an alert indicating abnormality of the item that is registered in the accounting machine.

Back to description of FIG. 7, for example, when the alert indicating abnormality of the item that is registered in the self-checkout terminal device 100 is generated, the output unit 45 causes the accounting machine that is the self-checkout terminal device 100 to display a message that is set previously. The message is, for example, "Just a moment, please. A staff will come." or "Is there any other items?" and is a message that prompts a customer to have a check and is able to gain time until a store staff arrives.

The output unit 45, for example, causes the information processing terminal device that a store staff uses and that is the store-staff terminal device 300 to output the alert containing the identifier of the accounting machine that is the self-checkout terminal device 100 in which the item with abnormality is registered. On receiving the alert, the store staff goes to the self-checkout terminal device 100 that is presented by the alert and checks the item that is registered by the customer in the self-checkout terminal device 100, etc.

Flow of Process

Figure 16:
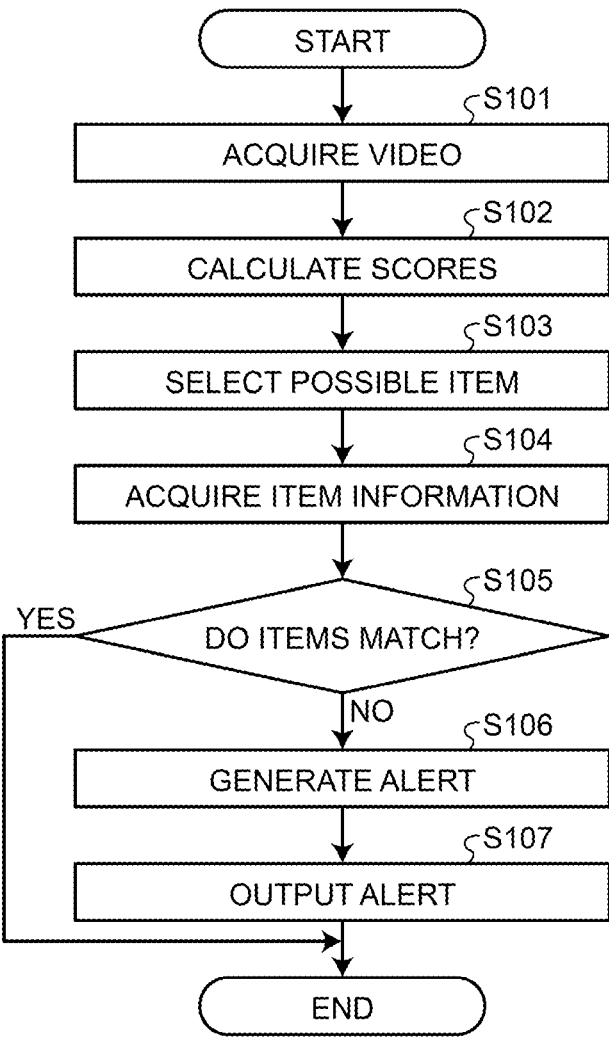
FIG. 16 is a flowchart illustrating a flow of a fraudulence sensing process according to the embodiment.

Using FIG. 16, a flow of a fraudulence sensing process that is executed by the information processing device 10 will be described next. FIG. 16 is a flowchart illustrating the flow of the fraudulence sensing process according to the embodiment. The fraudulence sensing process illustrated in FIG. 16, for example, may be started when the information processing device 10 receives item information that is registered by a customer in the self-checkout terminal device 100 from the self-checkout terminal device 100.

First of all, as illustrated in FIG. 16, the information processing device 10, for example, acquires a video of a person who grasps an item to be registered in the self-checkout terminal device 100, which is a video captured by the camera device 200, from the video DB 31 (step S101). Note that, because a video that is captured by the camera device 200 is stored as needed in the video DB 31 with respect to each self-checkout terminal device 100, for example, a video to be acquired may be determined based on the system date, the identifier, etc., that are contained in the item information that is received from the self-checkout terminal device 100.

For example, by inputting the video that is acquired at step S101 to the machine learning model, the information processing device 10 then calculates a score representing a level of reliability of the item contained in the video with respect to each of a plurality of possible items that are set previously (step S102).

For example, based on the scores calculated at step S102, the information processing device 10 selects a possible item as an item contained in the video from the possible items (step S103). For example, an item whose score calculated at step S102 is the largest is selected as a possible item.

The information processing device 10, for example, then acquires information on an item that is registered in the self-checkout terminal device 100 by the person by operating the self-checkout terminal device 100 from the item information 34 (step S104). Note that acquisition of the item information at step S104 may be executed before or in parallel with steps S101 to S103.

The information processing device 10 then determines whether the item of the possible item that is selected at step S103 and the item corresponding to the information on the item that is registered in the self-checkout terminal device 100 match (step S105). When the items match (YES at step S105), the information processing device 10 determines that fraudulence is not committed and the fraudulence sensing process ends.

On the other hand, when the items do not match (NO at step S105), the information processing device 10 senses a fraudulent act and generates an alert indicating abnormality on the item that is registered in the self-checkout terminal device 100 (step S106).

The information processing device 10 then outputs the alert that is generated at step S106 to the store-staff terminal device 300 (step S107). After execution of step S107, the fraudulence sensing process illustrated in FIG. 16 ends, and the information processing device 10 may further output a message that is set previously like "Just a moment, please. A staff will come." to the self-checkout terminal device 100 that senses a fraudulent act.

Figure 17:
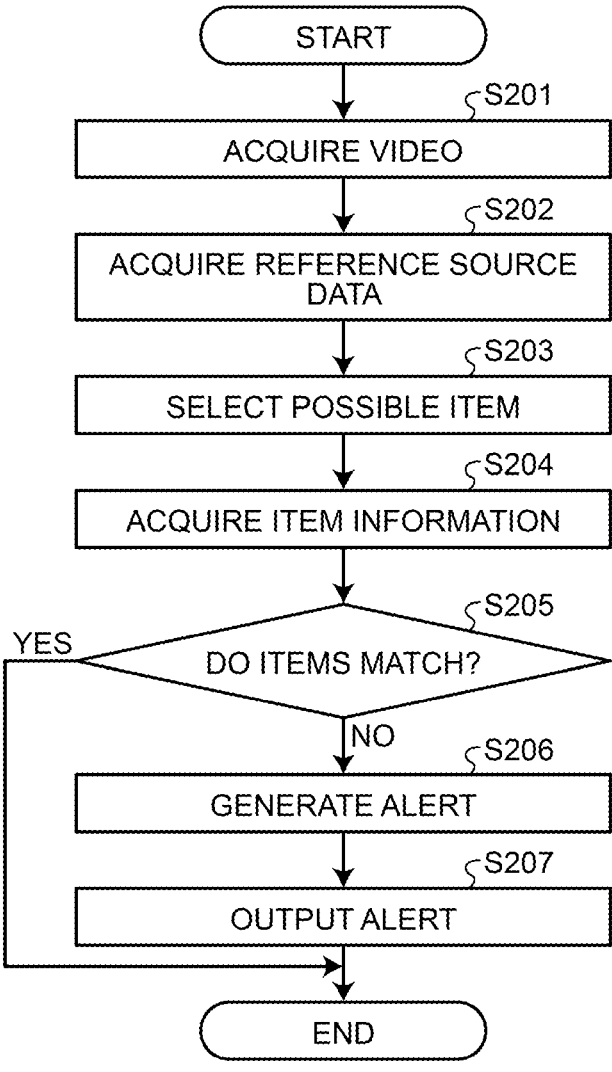
FIG. 17 is a flowchart illustrating another example of the flow of the fraudulence sensing process according to the embodiment.

The fraudulence sensing process illustrated in FIG. 16 is a process of selecting a possible item based on the scores indicating the levels of reliability of the item contained in the video, and another example of selecting a possible item based on hierarchic data will be described using FIG. 17. FIG. 17 is a flowchart illustrating another example of the flow of the fraudulence sensing process according to the embodiment. The fraudulence sensing process illustrated in FIG. 17 may be started, for example, when item information is received from the self-checkout terminal device 100 as in the case of the fraudulence sensing process illustrated in FIG. 16.

First of all, as illustrated in FIG. 17, the information processing device 10, for example, acquires a video of a person who grasps an item to be registered in the self-checkout terminal device 100 from the video DB 31 as in the case of the fraudulence sensing process (step S201).

The information processing device 10, for example, acquires reference source data from the model DB 32 (step S202). As described using FIGS. 9 to 14 may be, for example, a list of class captions that is generated by generating hierarchic data like that illustrated in FIG. 14 using the item list in FIG. 10 and the template in FIG. 11 and based on the hierarchic data.

For example, by inputting the video that is acquired at step S201 and the reference source data that is acquired at step S202 to the CLIP model 60, the information processing device 10 then selects a possible item as the item that is contained in the video (step S203). Steps S204 to S207 are similar to steps S104 to S107 of the fraudulence sensing process illustrated in FIG. 16. After execution of step S207, the fraudulence sensing process illustrated in FIG. 17 ends.

EFFECTS

As described above, the information processing device 10 acquires a video of a person who grasps an item to be registered in the self-checkout terminal device 100; by analyzing the acquired video, calculates a score indicating a level of reliability of the item that is contained in the video with respect to each of a plurality of possible items that are set previously; acquires information on the item that is registered in the self-checkout terminal device 100 by the person by operating the self-checkout terminal device 100; based on the calculated score, selects a possible item from the possible items; and, based on the selected possible item and the acquired information on the item, generates an alert indicating abnormality of the item that is registered in the self-checkout terminal device 100.

As described above, the information processing device 10 generates the alert based on the possible item that is selected based on the reliability score of the item that the person contained in the video grasps and the item that is registered in the self-checkout terminal device 100. This makes it possible to accurately sense a fraudulent act of a customer in the system in which customers themselves register items to be purchased. Furthermore, when generating an alert indicating abnormality of an item that is registered in the self-checkout terminal device 100, it is possible to reduce the amount of processing by the information processing device 10.

The calculating executed by the information processing device 10 includes calculating a score with respect to each of the possible items by inputting the acquired video to a machine learning model.

Accordingly, the information processing device 10 is able to accurately sense a fraudulent act of a customer in the system in which customers themselves register items to be purchased.

The accounting machine is the self-checkout terminal device 100.

Accordingly, the information processing device 10 is able to accurately sense a fraudulent act of a customer in a system in which customers themselves register items to be purchased in the self-checkout terminal device 100.

The information processing device 10 specifies the possible item with a first score that is the largest from the scores corresponding to the possible items, respectively; specifies a second score corresponding to the item that is registered in the self-checkout terminal device 100 from the scores corresponding to the possible items, respectively; and, when the possible item with the first score and the item that is registered in the self-checkout terminal device 100 do not match, determines whether to generate the alert based on a difference between the first score and the second score.

Accordingly, the information processing device 10 is able to accurately sense a fraudulent act of a customer in the system in which customers themselves register items to be purchased.

By inputting the acquired video to a machine learning model that refers to reference original data in which item attributes are associated with each of a plurality of layers, the information processing device 10 specifies a first item attribute contained in the video from the item attributes of a first layer; based on the specified first item attribute, specifies second item attributes from the item attributes of a second layer under the first layer; and, by inputting the acquired video to the machine learning model, selects the item attribute contained in the video as the possible item from the second item attributes.

Accordingly, the information processing device 10 is able to select an item contained in the video as a possible item more accurately and in detail.

When generating the alert, the information processing device 10 causes the self-checkout terminal device 100 to display a message that is previously set.

Accordingly, the information processing device 10 is able to prompt a customer to have a check and is able to gain time until a store staff arrives.

The information processing device 10 causes an information processing terminal device that a store staff uses to output the alert containing an identifier of the self-checkout terminal device 100 in which the item with abnormality is registered.

Accordingly, the information processing device 10 is able to notify a store staff of a fraudulent act of a customer in the system in which customers themselves register items to be purchased.

The process procedure, the control procedure, the specific names, and the information including various types of data and parameters that are presented in the description above and the drawings may be changed freely unless otherwise noted. The specific examples, the distribution, numerical values, etc., as an example only and they may be changed freely.

Specific modes of distribution and integration of components of each device are not limited to those illustrated in the drawings. In other words, all or part of the components may be distributed or integrated functionally or physically in any unit according to various types of load and usage. Furthermore, all or given part of each processing function of each device can be implemented by a central processing unit (CPU) and a program that is analyzed and executed by the CPU or can be implemented as hardware according to a wired logic.

Hardware

Figure 18:
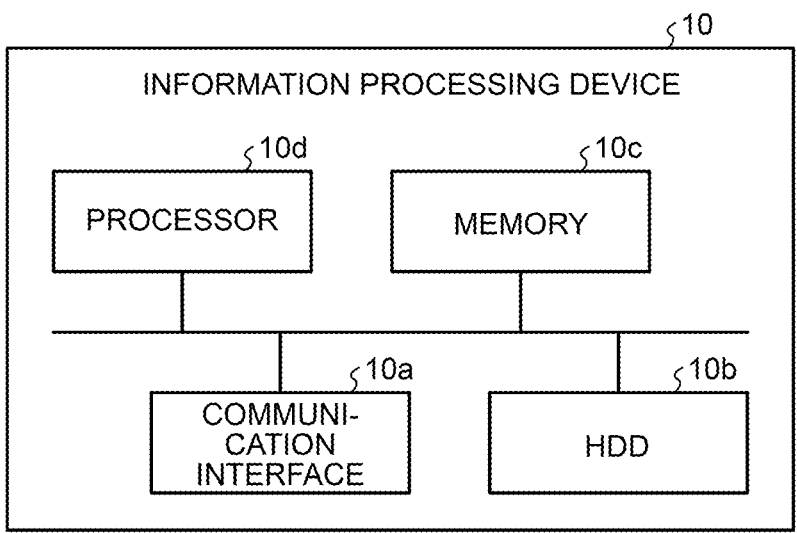
FIG. 18 is a diagram illustrating an example of a hardware configuration of the information processing device 10.

FIG. 18 is a diagram illustrating an example of a hardware configuration of the information processing device 10. As illustrated in FIG. 18, the information processing device 10 includes a communication interface 10*a*, a hard disk drive (HDD) 10*b*, a memory 10*c*, and a processor 10*d*. The units illustrated in FIG. 18 are mutually connected by a bus, or the like.

The communication interface 10*a* is a network interface card, or the like, and communicates with another information processing device. The HDD 10*b* stores a program that implements the functions illustrated in FIG. 7 and data.

The processor 10*d* is a hardware circuit that reads the program that executes the same process as that performed by each of the processors illustrated in FIG. 7 from the HDD 10*b*, or the like, and loads the program into the memory 10*c*, thereby running the process that implements each of the functions illustrated in FIG. 7, etc. In other words, the process executes the same functions as those of the respective processors that the information processing device 10 includes. Specifically, the processor 10*d* reads the program with the same functions as those of the acquisition unit 41 and the calculator 42 from the HDD 10*b*, or the like. The processor 10*d* executes the process that executes the same processing as that performed by the acquisition unit 41, the calculator 42, etc.

As described above, by reading and executing the program that executes the same process as that of each of the processors illustrated in FIG. 7, the information processing device 10 runs as an information processing device that executes an operation control process. Furthermore, by reading the program from a recording medium using a medium reading device and executing the read program, the information processing device 10 is able to implement the same functions as those of the above-described embodiments. The program according to another embodiment is not limited to being executed by the information processing device 10. For example, the embodiment may be similarly applied to the case where another computer executes the program and also to the case where the information processing device 10 and another computer execute the program cooperatively.

The program that executes the same process as that of each of the processors illustrated in FIG. 7 can be distributed via a network, such as the Internet. The program is recorded in a computer-readable recording medium, such as a hard disk, a flexible disk (FD), a CD-ROM, a MO (Magneto-Optical disk), or a DVD (Digital Versatile Disc), and is executable by being read by a computer from the recording medium.

Figure 19:
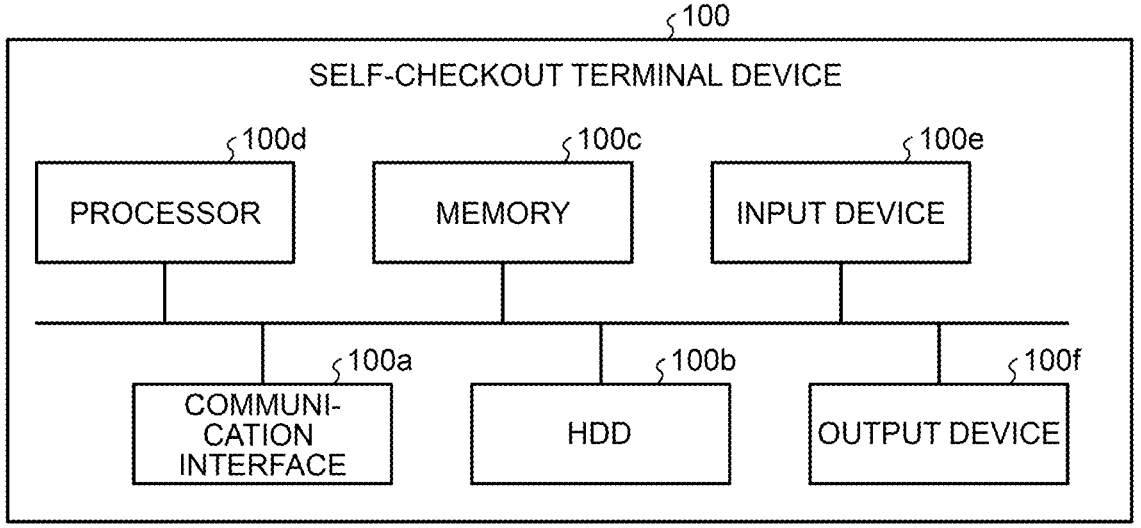
FIG. 19 is a diagram illustrating an example of a hardware configuration of the self-checkout terminal device 100.

FIG. 19 is a diagram illustrating an example of a hardware configuration of the self-checkout terminal device 100. As illustrated in FIG. 19, the self-checkout terminal device 100 includes a communication interface 100*a*, a HDD 100*b*, a memory 100*c*, a processor 100*d*, an input device 100*e*, and an output device 100*f*. The units illustrated in FIG. 19 are mutually connected by a bus, or the like.

The communication interface 100*a* is a network interface card, or the like, and communicates with another information processing device. The HDD 100*b* stores a program that implements each of the functions of the self-checkout terminal device 100 and data.

The processor 100*d* is a hardware circuit that reads the program that executes the process of each of the functions of the self-checkout terminal device 100 from the HDD 100*b*, or the like, and loads the program into the memory 100*c*, thereby running the process that implements each of the functions of the self-checkout terminal device 100. In other words, the process executes the same functions as those of the respective processors that the self-checkout terminal device 100 includes.

As described above, by reading and executing the program that executes the process of each of the functions of the self-checkout terminal device 100, the self-checkout terminal device 100 runs as an information processing device that executes an operation control process. Furthermore, by reading the program from a recording medium using a medium reading device and executing the read program, the self-checkout terminal device 100 is able to implement each of the functions of the self-checkout terminal device 100. The programs according to another embodiment is not limited to being executed by the self-checkout terminal device 100. For example, the embodiment may be similarly applied to the case where another computer or a server executes the program and also to the case where they execute the program cooperatively.

The program that executes the process of each of the functions of the self-checkout terminal device 100 can be distributed via a network, such as the Internet. The program is recorded in a computer-readable recording medium, such as a hard disk, a FD, a CD-ROM, a MO, or a DVD, and is executable by being read by a computer from the recording medium.

The input device 100*e* senses various types of input operations performed by a user, such as an input operation on the program that is executed by the processor 100*d*. The input device 100*e* may be, for example, a button, a touch panel, or a proximity sensor. The input operations that are sensed by the input device 100*e* may include, for example, a touch operation. In the case of the touch operation, the self-checkout terminal device 100 may, for example, include a touch-panel display device and an input operation that is sensed by the input device 100*e* may be a touch operation on the display device. The input operations that are sensed by the input device 100*e* may, for example, include an operation of reading a barcode, a credit card, or the like. In the case of the operation of reading a barcode, the input device 100*e* may, for example, include a code reader with a light source and an optical sensor and an input operation that is sensed by the input device 100*e* may be an operation of reading a barcode on the code reader. The touch-panel display device or the code reader on which the input operation that is sensed by the input device 100*e* is performed may be an external device that is connected to the self-checkout terminal device 100 such that communication with the self-checkout terminal device 100 is enabled.

The output device 100*f* may be a display device that displays data that is output from a program that is executed by the processor 100*d*, a printer device that prints the data, or an audio output device that reproduces a voice based on the data. Note that the display device or the code reader may be an external device that is connected to the self-checkout terminal device 100 such that communication with the self-checkout terminal device 100 is enabled.

Figure 20:
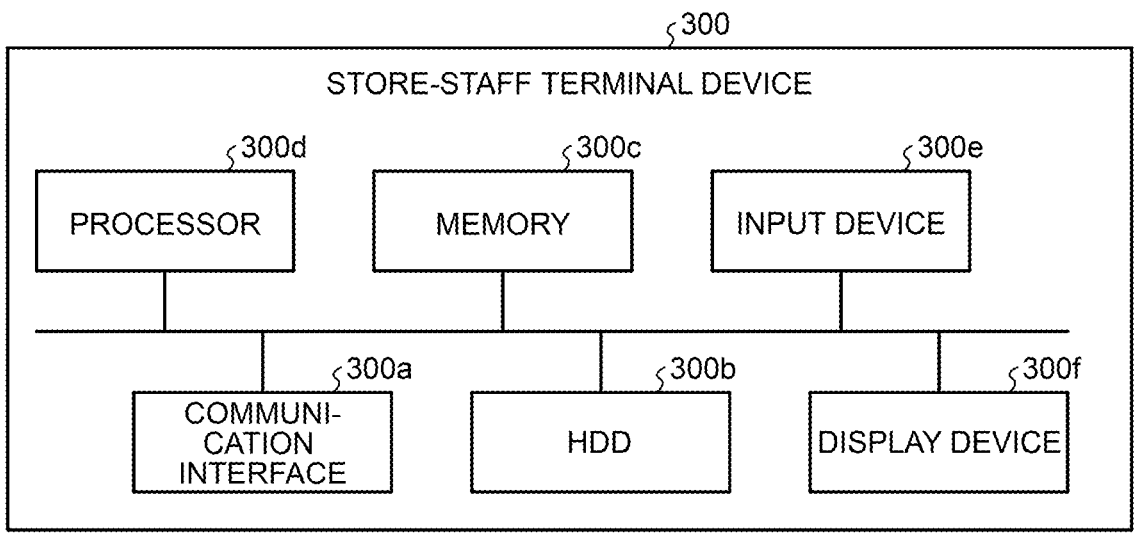
FIG. 20 is a diagram illustrating an example of a hardware configuration of a store-staff terminal device 300.

FIG. 20 is a diagram illustrating an example of a hardware configuration of the store-staff terminal device 300. As illustrated in FIG. 20, the store-staff terminal device 300 includes a communication interface 300*a*, a HDD 300*b*, a memory 300*c*, a processor 300*d*, an input device 300*e*, and a display device 300*f*. The units illustrated in FIG. 20 are mutually connected by a bus, or the like.

The communication interface 300*a* is a network interface card, or the like, and communicates with another information processing device. The HDD 300*b* stores a program that implements each of the functions of the store-staff terminal device 300 and data.

The processor 300*d* is a hardware circuit that reads the program that executes the process of each of the functions of the store-staff terminal device 300 from the HDD 300*b*, or the like, and loads the program into the memory 300*c*, thereby running the process that implements each of the functions of the store-staff terminal device 300. In other words, the process executes the same functions as those of the respective processors that the store-staff terminal device 300 includes.

As described above, by reading and executing the program that executes the process of each of the functions of the store-staff terminal device 300, the store-staff terminal device 300 runs as an information processing device that executes an operation control process. Furthermore, by reading the program from a recording medium using a medium reading device and executing the read program, the store-staff terminal device 300 is able to implement each of the functions of the store-staff terminal device 300. The programs according to another embodiment is not limited to being executed by the store-staff terminal device 300. For example, the embodiment may be similarly applied to the case where another computer or a server executes the program and also to the case where they execute the program cooperatively.

The program that executes the process of each of the functions of the store-staff terminal device 300 can be distributed via a network, such as the Internet. The program is recorded in a computer-readable recording medium, such as a hard disk, a FD, a CD-ROM, a MO, or a DVD, and is executable by being read by a computer from the recording medium.

The input device 300e senses various types of input operations performed by a user, such as an input operation on the program that is executed by the processor 300d. The input operations include, for example, a touch operation and insertion of an earphone terminal into the store-staff terminal device 300. The touch operation refers to various contact operations on the display device 300f, for example, a tap, a double tap, a swipe, or a pinch. The touch operation includes an operation of moving an object, such as a finger, close to the display device 300f. The input device 300e may be, for example, a button, a touch panel, a proximity sensor, or the like.

The display device 300f displays various types of visual information according to control by the processor 300d. the display device 300f may be a liquid crystal display (LCD) or an organic light emitting diode (OLED) that is what is called an electro luminescence (EL) display.

In one aspect, it is possible to more accurately sense a fraudulent act of a customer in a system in which customers themselves register items to be purchased.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:

inputting a video of respective possible items available in a store to a machine learning model trained to specify an item from the video, and calculating and storing scores indicating a level of reliability of the respective possible items;

acquiring a video of a person who grasps an item to be registered in an accounting machine;

inputting the acquired video, and calculating a first score that is highest among the scores of the respective possible items;

acquiring, from among the scores of the respective possible items, a second score corresponding to the item that is registered in the accounting machine by the person by operating the accounting machine;

when a difference between the first score and the second score is equal to or greater than a threshold, determining that the item grasped by the person is different from the item registered in the accounting machine; and generating an alert indicating abnormality of the item that is registered in the accounting machine.

2. The non-transitory computer-readable recording medium according to claim 1, wherein the accounting machine is a self-checkout terminal device.

3. The non-transitory computer-readable recording medium according to claim 1, wherein the process further includes:

the machine learning model is a contrastive language-image pre-training (CLIP) model that refers to reference original data in which item attributes are associated with each of a plurality of layers, and by inputting the acquired video to the CLIP model, specifying a first item attribute contained in the video from the item attributes of a first layer;

based on the specified first item attribute, specifying second item attributes from the item attributes of a second layer under the first layer; and by inputting the acquired video to the CLIP model, selecting the item attribute contained in the video as the possible item from the second item attributes.

4. The non-transitory computer-readable recording medium according to claim 1, wherein the process further includes, when generating the alert, causing the accounting machine to display a message that is previously set.

5. The non-transitory computer-readable recording medium according to claim 1, wherein the process further includes causing an information processing terminal device that a store staff uses to output the alert containing an identifier of the accounting machine in which the item with abnormality is registered.

6. An information processing method that causes a computer to execute a process comprising:

inputting a video of respective possible items available in a store to a machine learning model trained to specify an item from the video, and calculating and storing scores indicating a level of reliability of the respective possible items;

acquiring a video of a person who grasps an item to be registered in an accounting machine;

inputting the acquired video, and calculating a first score that is highest among the scores of the respective possible items;

acquiring, from among the scores of the respective possible items, a second score corresponding to the item that is registered in the accounting machine by the person by operating the accounting machine;

when a difference between the first score and the second score is equal to or greater than a threshold, determining that the item grasped by the person is different from the item registered in the accounting machine; and generating an alert indicating abnormality of the item that is registered in the accounting machine.

7. The information processing method according to claim 6, wherein the accounting machine is a self-checkout terminal device.

8. The information processing method according to claim 6, wherein the process further includes:

the machine learning model is a contrastive language-image pre-training (CLIP) model that refers to reference original data in which item attributes are associated with each of a plurality of layers, and by inputting the acquired video to the CLIP model, specifying a first item attribute contained in the video from the item attributes of a first layer;

based on the specified first item attribute, specifying second item attributes from the item attributes of a second layer under the first layer; and by inputting the acquired video to the CLIP model, selecting the item attribute contained in the video as the possible item from the second item attributes.

9. The information processing method according to claim 6, wherein the process further includes, when generating the alert, causing the accounting machine to display a message that is previously set.

10. The information processing method according to claim 6, wherein the process further includes causing an information processing terminal device that a store staff uses to output the alert containing an identifier of the accounting machine in which the item with abnormality is registered.

11. An information processing device comprising:

a memory; and a processor coupled to the memory and configured to:

input a video of respective possible items available in a store to a machine learning model trained to specify an item from the video, and calculate and store scores indicating a level of reliability of the respective possible items;

acquire a video of a person who grasps an item to be registered in an accounting machine;

input the acquired video, and calculating a first score that is highest among the scores of the respective possible items;

acquire, from among the scores of the respective possible items, a second score corresponding to the item that is registered in the accounting machine by the person by operating the accounting machine;

when a difference between the first score and the second score is equal to or greater than a threshold, determining that the item grasped by the person is different from the item registered in the accounting machine; and generate an alert indicating abnormality of the item that is registered in the accounting machine.

12. The information processing device according to claim 11, wherein the accounting machine is a self-checkout terminal device.

13. The information processing device according to claim 11, wherein the processor is further configured to:

the machine learning model is a contrastive language-image pre-training (CLIP) model that refers to reference original data in which item attributes are associated with each of a plurality of layers, and by inputting the acquired video to the CLIP model, specify a first item attribute contained in the video from the item attributes of a first layer;

based on the specified first item attribute, specifying second item attributes from the item attributes of a second layer under the first layer; and by inputting the acquired video to the CLIP model, selecting the item attribute contained in the video as the possible item from the second item attributes.

* * * * *